United States Patent
Kano

(10) Patent No.: US 9,691,134 B2
(45) Date of Patent: Jun. 27, 2017

(54) IMAGE PROCESSING APPARATUS THAT PERFORMS IMAGE RESTORATION PROCESSING AND IMAGE PROCESSING METHOD

(71) Applicant: CANON KABUSHIKI KAISHA, Tokyo (JP)

(72) Inventor: Akira Kano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 14/689,848

(22) Filed: Apr. 17, 2015

(65) Prior Publication Data

US 2015/0310592 A1 Oct. 29, 2015

(30) Foreign Application Priority Data

Apr. 25, 2014 (JP) .................. 2014-091349

(51) Int. Cl.
*G06K 9/00* (2006.01)
*G06T 5/00* (2006.01)
*H04N 1/58* (2006.01)

(52) U.S. Cl.
CPC .............. *G06T 5/001* (2013.01); *H04N 1/58* (2013.01); *G06T 2207/10004* (2013.01); *G06T 2207/10024* (2013.01)

(58) Field of Classification Search
None
See application file for complete search history.

(56) References Cited

U.S. PATENT DOCUMENTS 5,879,284 A 3/1999 Tsujita
6,813,040 B1 * 11/2004 Uchino ................ H04N 1/2158
358/1.9

(Continued)

FOREIGN PATENT DOCUMENTS

EP 1944982 A1 7/2008
EP 2566161 A2 3/2013

(Continued)

OTHER PUBLICATIONS

European Office Action dated Sep. 18, 2015 from counterpart European Patent No. 15164106.5.

*Primary Examiner* — Feng Niu
(74) *Attorney, Agent, or Firm* — Fitzpatrick, Cella, Harper & Scinto

(57) ABSTRACT

An image processing apparatus capable of properly suppressing coloring caused by image restoration processing. A feature amount of a color of pixels in RAW image data obtained through photographing via an image pickup optical system is calculated as a first color feature amount. Restoration processing is performed on the RAW image data using a restoration filter for improving image quality degraded due to aberration of the image pickup optical system to thereby generate restored image data. A feature amount of a color of pixels in the restored image data is calculated as a second color feature amount. A pixel value of the restored image data is corrected according to a result of comparison between an amount of change in the second color feature amount with respect to the first color feature amount and a threshold value which is set based on a predetermined condition.

15 Claims, 16 Drawing Sheets

(56) References Cited

U.S. PATENT DOCUMENTS

| | | | |
|---|---|---|---|
| 8,019,174 B2* | 9/2011 | Tsuruoka | H04N 5/217 |
| | | | 382/162 |
| 8,436,910 B2* | 5/2013 | Kinoshita | G06T 5/006 |
| | | | 348/222.1 |
| 8,605,163 B2 | 12/2013 | Hatakeyama | |
| 2006/0087561 A1* | 4/2006 | Kojima | H04N 5/23248 |
| | | | 348/208.5 |
| 2008/0193019 A1* | 8/2008 | Tsuruoka | G06T 7/408 |
| | | | 382/195 |
| 2010/0039539 A1* | 2/2010 | Kinoshita | G06T 5/006 |
| | | | 348/242 |
| 2010/0079615 A1 | 4/2010 | Hatakeyama | |
| 2012/0070083 A1* | 3/2012 | Ishiga | H04N 9/045 |
| | | | 382/167 |

FOREIGN PATENT DOCUMENTS

| | | |
|---|---|---|
| JP | 10-165365 A | 6/1998 |
| JP | 2010-086138 A | 4/2010 |

\* cited by examiner

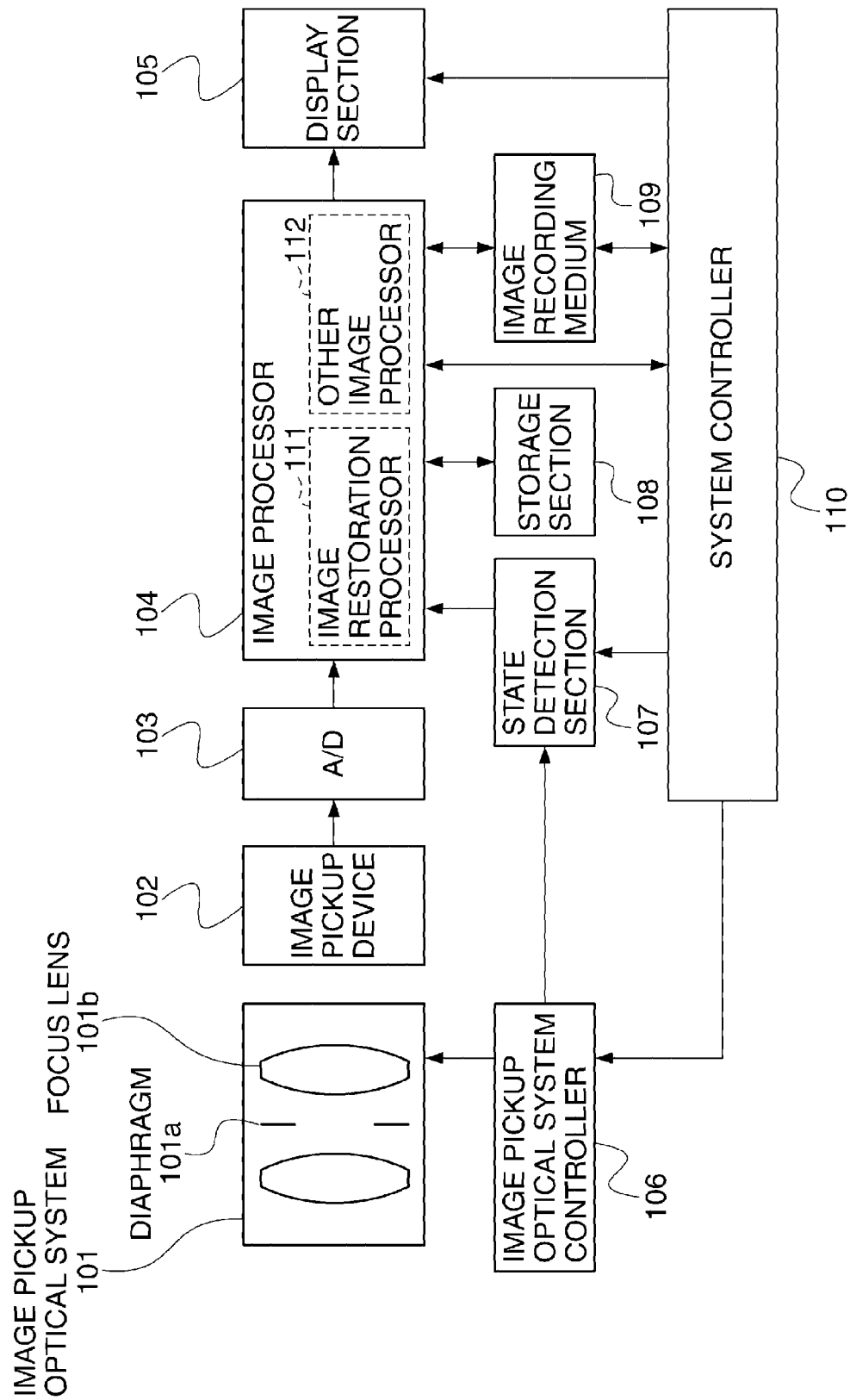

*FIG. 2A*

| R | G | R | G | R | G |
|---|---|---|---|---|---|
| G | B | G | B | G | B |
| R | G | R | G | R | G |
| G | B | G | B | G | B |
| R | G | R | G | R | G |
| G | B | G | B | G | B |

*FIG. 2B*

|   | G |   | G |   | G |
|---|---|---|---|---|---|
| G |   | G |   | G |   |
|   | G |   | G |   | G |
| G |   | G |   | G |   |
|   | G |   | G |   | G |
| G |   | G |   | G |   |

*FIG. 2C*

| R |   | R |   | R |   |
|---|---|---|---|---|---|
|   |   |   |   |   |   |
| R |   | R |   | R |   |
|   |   |   |   |   |   |
| R |   | R |   | R |   |
|   |   |   |   |   |   |

*FIG. 2D*

|   |   |   |   |   |   |
|---|---|---|---|---|---|
|   | B |   | B |   | B |
|   |   |   |   |   |   |
|   | B |   | B |   | B |
|   |   |   |   |   |   |
|   | B |   | B |   | B |

*FIG. 2E*

| G | G | G | G | G | G |
|---|---|---|---|---|---|
| G | G | G | G | G | G |
| G | G | G | G | G | G |
| G | G | G | G | G | G |
| G | G | G | G | G | G |
| G | G | G | G | G | G |

| 100 | 100 | 100 | 200 | 200 |
|-----|-----|-----|-----|-----|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

FIG. 6A

|   | 0 | 1 | 2 | 3 | 4 |
|---|---|---|---|---|---|
| 0 | 100 |  | 100 |  | 200 |
| 1 |  | 100 |  | 200 |  |
| 2 | 100 |  | 100 |  | 200 |
| 3 |  | 100 |  | 200 |  |
| 4 | 100 |  | 100 |  | 200 |

G BEFORE INTERPOLATION

FIG. 6B

|   | 0 | 1 | 2 | 3 | 4 |
|---|---|---|---|---|---|
| 0 |  | 100 |  | 200 |  |
| 1 |  |  |  |  |  |
| 2 |  | 100 |  | 200 |  |
| 3 |  |  |  |  |  |
| 4 |  | 100 |  | 200 |  |

R BEFORE INTERPOLATION

FIG. 6C

|   | 0 | 1 | 2 | 3 | 4 |
|---|---|---|---|---|---|
| 0 |  |  |  |  |  |
| 1 | 100 |  | 100 |  | 200 |
| 2 |  |  |  |  |  |
| 3 | 100 |  | 100 |  | 200 |
| 4 |  |  |  |  |  |

B BEFORE INTERPOLATION

FIG. 6D

| 100 | 100 | 100 | 175 | 200 |
|---|---|---|---|---|
| 100 | 100 | 125 | 200 | 200 |
| 100 | 100 | 100 | 175 | 200 |
| 100 | 100 | 125 | 200 | 200 |
| 100 | 100 | 100 | 175 | 200 |

G AFTER LINEAR INTERPOLATION

FIG. 6E

| 100 | 100 | 150 | 200 | 200 |
|---|---|---|---|---|
| 100 | 100 | 150 | 200 | 200 |
| 100 | 100 | 150 | 200 | 200 |
| 100 | 100 | 150 | 200 | 200 |
| 100 | 100 | 150 | 200 | 200 |

R AFTER LINEAR INTERPOLATION

FIG. 6F

| 100 | 100 | 100 | 150 | 200 |
|---|---|---|---|---|
| 100 | 100 | 100 | 150 | 200 |
| 100 | 100 | 100 | 150 | 200 |
| 100 | 100 | 100 | 150 | 200 |
| 100 | 100 | 100 | 150 | 200 |

B AFTER LINEAR INTERPOLATION

FIG. 6G

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

G AFTER ADAPTIVE INTERPOLATION

FIG. 6H

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

R AFTER ADAPTIVE INTERPOLATION

FIG. 6I

| 100 | 100 | 100 | 200 | 200 |
|---|---|---|---|---|
| 100 | 100 | 100 | 200 | 200 |
| 100 | 100 | 100 | 200 | 200 |
| 100 | 100 | 100 | 200 | 200 |
| 100 | 100 | 100 | 200 | 200 |

B AFTER ADAPTIVE INTERPOLATION

LOW SENSITIVITY

HIGH SENSITIVITY

PIXEL VALUE BEFORE RESTORATION

PIXEL VALUE AFTER RESTORATION

COLOR DIFFERENCE BEFORE RESTORATION

COLOR DIFFERENCE AFTER RESTORATION

COMPARISON OF COLOR DIFFERENCE BEFORE/AFTER RESTORATION (MOVING AVERAGE)

IMAGE PROCESSING APPARATUS THAT PERFORMS IMAGE RESTORATION PROCESSING AND IMAGE PROCESSING METHOD

BACKGROUND OF THE INVENTION

Field of the Invention

The present invention relates to an image processing apparatus that performs image restoration processing and an image processing method, and more particularly to processing for correcting a degraded image.

Description of the Related Art

In general, when obtaining an image by photographing an object using an image pickup apparatus, such as a digital camera, the image is significantly degraded e.g. due to aberration of an image pickup optical system (i.e. the image is blurred). A blur of an image is generally caused by spherical aberration, coma aberration, field curvature, astigmatic aberration, or the like, of the image pickup optical system. In an aplanatic state without any influence of diffraction, a light flux from one point of the object converges to one point again on an image pickup surface of an image pickup device. On the other hand, if any of the above-mentioned aberrations exists, light, which should converge to one point again on the image pickup surface, diverges to generate a blur component on an image thus formed.

The blur component generated on the image is optically defined by a point spread function (PSF). Although an image which is out of focus is also blurred, here, a blur of an image caused by aberration of the image pickup optical system even if the image is in focus is referred to as the "blur". As for color bleeding on a color image, color bleeding caused by axial chromatic aberration of the image pickup optical system, spherical aberration of color, and comatic aberration of color can be referred to as different manners of blurring dependent on wavelengths of light. Further, as for color shift in a horizontal direction of an image, color shift caused by lateral chromatic aberration of the image pickup optical system can be referred to as positional shift or phase shift caused by different image pickup magnifications dependent on wavelengths of light.

An optical transfer function (OTF) obtained by Fourier transform of the above-mentioned PSF is a frequency component of aberration, and is represented by a complex number. An absolute value of the optical transfer function (OTF) (hereafter, the "optical transfer function" is simply referred to as the "OTF" as deemed appropriate), i.e. an amplitude component is referred to as the modulation transfer function (MTF), and a phase component is referred to as the phase transfer function (PTF).

These MTF and PTF are frequency characteristics of, respectively, the amplitude component and the phase component of degradation of an image caused by aberration. The phase component is expressed as a phase angle by the following equation (1). Note that Re(OTF) and Im(OTF) express the real part and the imaginary part of the OTF, respectively:

$$PTF = \tan^{-1}\{Im(OTF)/Re(OTF)\} \quad (1)$$

The OTF in the image pickup optical system degrades the amplitude component and the phase component of an image, and hence in the degraded image, points of the object are asymmetrically blurred e.g. in a case where the degradation is caused by comatic aberration. Further, in a case where the degradation is caused by lateral chromatic aberration, the image formation position is shifted due to an image formation magnification different between optical wavelengths, and when the light is received as the RGB color components according to spectral characteristics of light reflected from the object, this causes different image magnifications between the color components.

This causes shifts in image formation position not only between the red, green and blue (RGB) components, but also between the wavelengths in each color component. That is, the image is diverged by the phase shift. To be exact, the lateral chromatic aberration does not generate simple parallel color shift. However, description below will be given assuming that the color shift has the same meaning as the lateral chromatic aberration, unless otherwise specified.

As a method of correcting degradation in amplitude (MTF) and degradation in phase (PTF), for example, a method of correcting degradation using the OTF of the image pickup optical system is known. This method is referred to as image restoration or image recovery. In the following description, processing for correcting degradation of an image using the OTF of the image pickup optical system is referred to as image restoration processing or simply restoration processing.

Now, the outline of image restoration processing will be described. Let it be assumed that a degraded image is represented by g(x, y), the original image is represented by f(x, y), and the PSF obtained by performing inverse Fourier transform on the OTF is represented by h(x, y). In this case, the following equation (2) holds. Note that * represents convolution, and (x, y) represent coordinates on the image.

$$g(x,y) = h(x,y) * f(x,y) \quad (2)$$

When the equation (2) is converted to a frequency-based form by Fourier transform, this gives a form of the product, on a frequency-by-frequency basis, as represented by the following equation (3). Note that H represents a result of Fourier transform of the PSF, i.e. the OTF, and G and F represent results of Fourier transform of the degraded image g and the original image f, respectively. Values of (u, v) represent coordinates of a point on a two-dimensional frequency surface, i.e. a frequency.

$$G(u,v) = H(u,v) \cdot F(u,v) \quad (3)$$

To obtain the original image from the degraded image obtained through photographing, it is only required to divide both sides of the equation (3) by H, as represented by the following equation (4):

$$G(u,v)/H(u,v) = F(u,v) \quad (4)$$

By returning F(u, v) in the equation (4) by inverse Fourier transform to a real surface, it is possible to obtain the original image f(x, y) as a restored image.

Here, assuming that a result of inverse Fourier transform of 1/H in the equation (4) is represented by R, by performing convolution processing on the image on the real surface, as represented by the following equation (5), it is possible to similarly obtain the original image.

$$g(x,y) * R(x,y) = f(x,y) \quad (5)$$

R(x, y) in the equation (5) is referred to as an image restoration filter. The actual image has a noise component, and hence if the image restoration filter generated by the reciprocal of the OTF is used as mentioned above, the noise component is amplified together with the degraded image, and as a result, it is impossible to obtain a good image.

To prevent the noise component from being amplified, for example, there has been proposed a method of suppressing a restoration rate of high-frequency components of an image according to an intensity ratio between the image and noise, as in the Wiener filter. Further, as a method of correcting degradation of an image, caused by a color bleeding component, there has been proposed a method of correcting the color bleeding component by correcting the above-mentioned blur component such that the amount of blur is uniform for each of color components of the image.

The OTF changes according to the photographing state, such as a state of a zoom position, and a state of an aperture diameter. Therefore, the image restoration filter used in image restoration processing is also required to be changed according to the photographing state. For example, in an endoscope for observing an inside of a living body, there has been proposed a method of eliminating a blur of an image in a range outside an in-focus range of an image pickup section, using the PSF according to a fluorescent wavelength (see Japanese Patent Laid-Open Publication No. H10-165365). In this method, since the fluorescence is weak, an objective optical system having a small F-number is required. However, if the objective optical system having a small F-number is used, a depth of focus becomes shallow, and hence an in-focus image is obtained by performing image restoration processing for a range in which the object is out of focus.

As described above, image restoration processing is performed on an image obtained through photographing to thereby correct the above-mentioned various types of aberration, whereby it is possible to improve image quality. However, in performing photographing, the photographing state and the state of the image restoration filter do not always optimally match. For example, when photographing a three-dimensional object, such a problem occurs.

In the image pickup apparatus, photographing is performed by focusing on one surface of an object space using auto focus or manual focus. In doing this, in a case where the object is three-dimensional, the object distance is different depending on the angle of view. An object which is in focus is relatively sharply photographed, but an object which is out of focus is photographed with an amount of blur dependent on the distance. When information on the object distance is acquired only as to an in-focus point, an image restoration filter optimum for each angle of view in this object distance is selected or generated for use.

On an image after being subjected to image restoration processing, the image restoration filter is optimum for an object which is in focus, and hence it is possible to obtain desired sharpness. On the other hand, the image restoration filter is not optimum for an object which is out of focus, and hence although some effect of restoration is obtained, the image is still blurred.

On the other hand, it is conventionally known that a degree of blur dependent on the object distance produces excellent effects in expressing three-dimensionality of an object or expressing an object being watched in isolation from its background. For example, by using a telephoto lens with a shallow depth of field, an image is expressed such that a main object is in focus and the background is intentionally blurred. In this case, also on the image after being subjected to image restoration processing, it is desirable that the object which is in focus is made sharper, and the object which is out of focus remains still blurred, and blurring expression is performed by using the above-mentioned image restoration method.

However, if the object which is out of focus is subjected to image restoration processing using an image restoration filter which is not optimum for the distance of the out-of-focus object, coloring sometimes occurs on the image. Note that the term "coloring" refers to a defect that a color which is not included in the object is generated on the image after being subjected to image restoration processing because a relationship of blurring between the respective color components on edge portions of the out-of-focus object is different before and after execution of image restoration processing.

Further, such coloring sometimes occurs not only in photographing of a three-dimensional object. More specifically, coloring occurs irrespective of whether or not the object is in focus, if the aberration state in the actual photographing state and the aberration state targeted by the image restoration filter are different e.g. due to manufacturing variation of the image pickup optical system or variation of spectrum of a light source in photographing.

As a method of suppressing the coloring described above, for example, there has been proposed a method of correcting the color of an image after being subjected to image restoration processing based on color information on the image before being subjected to image restoration processing. In this method, a change in color, caused by image restoration processing, is determined for each pixel of the image to thereby suppress coloring caused by image restoration processing.

For example, there has been proposed a method of correcting a signal value so as to reduce an amount of color difference when the color difference in an image after being subjected to image restoration processing becomes larger than that before being subjected to image restoration processing (see e.g. Japanese Patent Laid-Open Publication No. 2010-86138).

As described above, by performing image restoration processing on an image obtained through photographing to reduce coloring which occurs e.g. on an image of an object which is out of focus, and correcting various types of aberration, it is possible to improve image quality.

However, in performing photographing, noise is generated during photoelectric conversion performed by the image pickup device, whereby a noise component is included in the image. In general, as the sensitivity of the image pickup device is set to be higher, this noise becomes larger. When coloring suppression processing is performed on the image including a lot of noise generated during photoelectric conversion, according to a color difference before and after being subjected to restoration processing, color tone of the object in the image is sometimes changed or inaccurate.

FIGS. 20A to 20E are diagrams useful in explaining pixel values of a G signal and an R signal and a color difference between the G and R signals along one line in an image including noise generated during photoelectric conversion performed by the image pickup device before and after being subjected to restoration processing. FIG. 20A shows changes in pixel values before restoration processing while FIG. 20B shows changes in pixel values after restoration processing. FIG. 20C shows changes in color difference before restoration processing while FIG. 20D shows changes in color difference after restoration processing. Further, FIG. 20E shows comparison of the color differences before and after restoration processing.

In this example, although changes in brightness and color of the object are small, as shown in FIG. 20A, the pixel value changes due to noise generated before image restoration processing. As mentioned hereinabove, it is desirable that the image restoration filter used in image restoration processing is formed by taking into account amplification of noise.

However, it is difficult to completely separate a degraded image degraded by aberration of the image pickup optical system and a noise component, and hence the noise is amplified by image restoration processing. That is, as shown in FIG. 20B, changes in pixel value are not reduced after image restoration processing. Note that in FIG. 20B, "R" represents an R signal value after applying the image restoration filter, and "R'" represents a signal value on which correction for suppressing coloring has been performed.

FIG. 20C shows the color difference before image restoration processing, and the color difference here refers to a difference (R−G) between the G signal and the R signal. FIG. 20D shows the color difference after image restoration processing, in which "Cr" represents the color difference after applying the image restoration filter, and "Cr'" represents the color difference on which correction for suppressing coloring has been performed. In this example, the R signal is corrected with respect to a pixel whose color difference is larger after being subjected to image restoration processing than before being subjected to image restoration processing, such that the amount of color difference is reduced.

FIG. 20E shows a moving average of the color difference for the purpose of comparison between the respective color differences before and after image restoration processing. Although in image processing performed by the image pickup apparatus, so-called color difference smoothing processing is performed, in this example, color tone of an image of an object in viewing the image is compared using moving averages as a simplified method.

As shown in FIG. 20E, when correction for suppressing coloring is performed, a change in the color tone occurs between before and after image restoration processing. Further, the change in the color tone shows a tendency made different by the amount of noise. That is, the amount of change in color tone is also changed depending on the sensitivity (ISO sensitivity) of the image pickup device.

However, the method described in Japanese Patent Laid-Open Publication No. 2010-86138 does not address a change in the color tone caused by the amount of noise, and hence it is difficult to properly suppress coloring caused by image restoration processing.

SUMMARY OF THE INVENTION

The present invention provides an image processing apparatus and an image processing method that are capable of properly suppressing coloring caused by image restoration processing.

In a first aspect of the present invention, there is provided an image processing apparatus comprising at least one processor that functions as a first calculation unit configured to calculate a feature amount of a color of pixels in first image data obtained according to an optical image formed on an image pickup device via an image pickup optical member, as a first color feature amount, a restoration processing unit configured to perform restoration processing on the first image data, using a restoration filter for improving image quality degraded due to the image pickup optical member, to thereby generate second image data, a second calculation unit configured to calculate a feature amount of a color of pixels in the second image data as a second color feature amount, and a correction unit configured to correct pixel values of the second image data according to a result of comparison between an amount of change in the second color feature amount with respect to the first color feature amount, and a threshold value, wherein the correction unit is configured to set the threshold value based on a predetermined condition.

In a second aspect of the present invention, there is provided an image processing method comprising calculating a feature amount of a color of pixels in first image data obtained according to an optical image formed on an image pickup device via an image pickup optical member, as a first color feature amount, performing restoration processing on the first image data, using a restoration filter for improving image quality degraded due to the image pickup optical member, to thereby generate second image data, calculating a feature amount of a color of pixels in the second image data as a second color feature amount, and correcting pixel values of the second image data according to a result of comparison between an amount of change in the second color feature amount with respect to the first color feature amount, and a threshold value, wherein the threshold value is set based on a predetermined condition.

According to the present invention, after being subjected to image restoration processing, each pixel value of the image is corrected according to a result of comparison between a difference between the first color feature amount and the second color feature amount with the predetermined threshold value. Therefore, it is possible to properly suppress coloring caused by image restoration processing.

Further features of the present invention will become apparent from the following description of exemplary embodiments with reference to the attached drawings.

BRIEF DESCRIPTION OF THE DRAWINGS

FIG. 1 is a block diagram of a digital camera as an image pickup apparatus equipped with an image processing apparatus according to a first embodiment of the present invention.

FIGS. 2A to 2E are diagrams useful in explaining an example (Bayer array) of an image (RAW image) input to an image restoration processor, appearing in FIG. 1, in which FIG. 2A shows an RGB plane (Bayer array) of the RAW image, FIGS. 2B to 2D show respective planes of color components, and FIG. 2E shows a state of a G component plane subjected to interpolation processing.

FIGS. 5A and 5B are diagrams useful in explaining an example of pixel interpolation on an edge portion using an adaptive pixel interpolation processing method, in which FIG. 5A shows changes in pixel value (signal value) indicative of brightness on the edge portion, and FIG. 5B shows a pixel array in FIG. 5A.

FIGS. 6A to 6I are diagrams useful in explaining a pixel array in a RAW image obtained through photographing by an image pickup device having pixels of the Bayer array, in which FIG. 6A shows a G component plane before interpolation, FIG. 6B show an R component plane before interpolation, FIG. 6C shows a B component plane before interpolation, FIG. 6D shows a G component plane after linear interpolation, FIG. 6E shows an R component plane after linear interpolation, FIG. 6F shows a B component plane after linear interpolation, FIG. 6G shows a G component plane after adaptive interpolation, FIG. 6H shows an R component plane after adaptive interpolation, and FIG. 6I shows a B component plane after adaptive interpolation.

FIGS. 7A and 7B are diagrams useful in explaining an example of an image restoration filter, in which FIG. 7A shows the image restoration filter, and FIG. 7B shows a relationship between a tap and a filter coefficient associated with the tap.

FIGS. 8A and 8B are diagrams useful in explaining an example of the image restoration filter used by the image restoration processor shown in FIG. 3, in which FIG. 8A shows an example of the image restoration filter applied to a G component, and FIG. 8B shows an example of the image restoration filter applied to R and B components.

FIGS. 11A and 11B are diagrams useful in explaining changes in pixel value (signal value) indicative of brightness in an edge portion in a case where development processing is performed on an image subjected to the image restoration process described with reference to FIG. 4 and an image not subjected to the image restoration process, in which FIG. 11A shows changes in brightness at a low sensitivity, and FIG. 11B shows changes in brightness at a high sensitivity.

FIG. 12E shows an increase/decrease rate (restoration gain) of the MTF caused by applying the image restoration filter.

FIGS. 20A to 20E are diagrams useful in explaining pixel values of a G signal and an R signal and a color difference between the G and R signals along one line in an image including noise generated during photoelectric conversion performed by the image pickup device before and after being subjected to restoration processing, in which FIG. 20A shows changes in pixel values before restoration processing, FIG. 20B shows changes in pixel values after restoration processing, FIG. 20C shows changes in color difference before restoration processing, FIG. 20D shows changes in color difference after restoration processing, and FIG. 20E shows comparison of the color differences before and after restoration processing.

DESCRIPTION OF THE EMBODIMENTS

Figure 3:
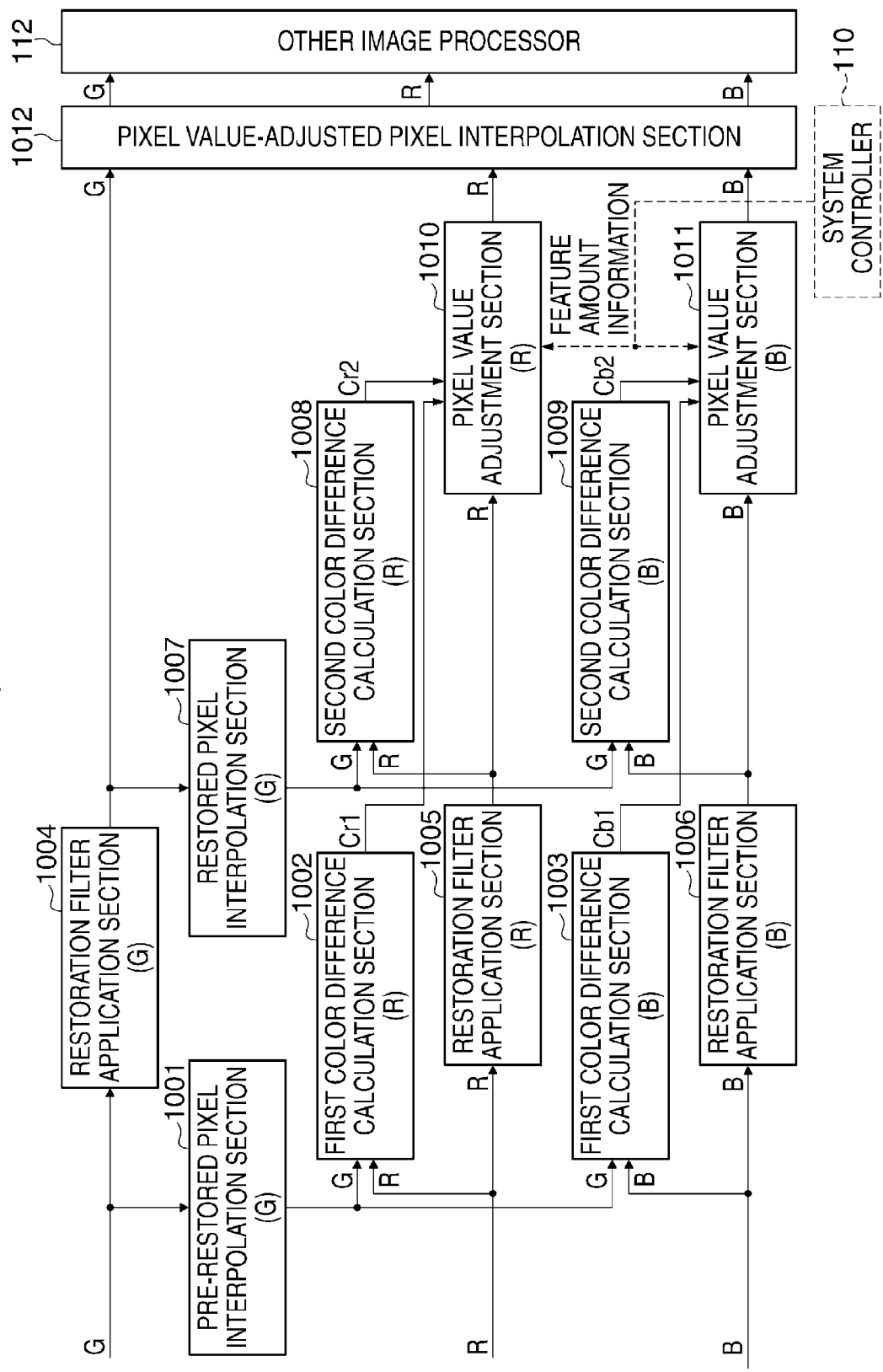
FIG. 3 is a block diagram of the image restoration processor 111 appearing in FIG. 1.

Embodiments of the Present Invention will now be described in detail below with reference to the accompanying drawings.

FIG. 1 is a block diagram of an image pickup apparatus equipped with an image processing apparatus according to a first embodiment of the present invention.

The image pickup apparatus shown in FIG. 1 is for example a digital camera (hereinafter simply referred to as the camera), and includes an image pickup optical system 101. The image pickup optical system 101 is provided with at least a diaphragm 101a and a focus lens 101b. An image pickup device 102, such as a CMOS image sensor, is disposed downstream of the image pickup optical system 101, and an optical image (object image) incident through the image pickup optical system 101 is formed on the image pickup device 102.

The image pickup device 102 photoelectrically converts the optical image to electrical signals, and outputs the electrical signals (analog signals) corresponding to the optical image. Then, the analog signals are converted to digital signals by an analog to digital (A/D) converter 103, and are input to an image processor 104.

The image processor 104 includes an image restoration processor 111 that performs image restoration processing for restoring degraded image quality, and another image processor 112 that performs predetermined processing. The image processor 104 obtains photographing state information indicative of a photographing state of the camera from a state detection section 107. The state detection section 107 may be configured to obtain the photographing state information directly from a system controller 110. Additionally or alternatively, the state detection section 107 may be configured to obtain photographing state information concerning the image pickup optical system 101 from an image pickup optical system controller 106.

Next, the image processor 104 selects an image restoration filter from a storage section 108 according to the photographing state information. The image processor 104 performs white balance processing on the digital signal, and thereafter performs image restoration processing by the image restoration processor 111. Specifically, the image restoration processor 111 performs image restoration processing for applying the image restoration filter to digital signals (i.e. an image). The processing performed by the image restoration processor 111 will be described hereinafter.

The storage section 108 may be configured not to record the image restoration filter itself, but to record OTF information concerning an optical transfer function (OTF) necessary for generating the image restoration filter. In this case, the image restoration processor 111 selects the OTF information from the storage section 108 according to the photographing state information, and generates the image restoration filter based on the selected OTF information. Then, the image processor 111 performs image restoration processing on the image using the generated image restoration filter. The other image processor 112 performs gamma correction, color balance adjustment, and so on, as predetermined processing, on the image subjected to image restoration processing, and generates an image file (hereinafter also referred to as the output image), such as a JPEG file.

The image processor 104 stores the output image in an image recording medium 109 in a predetermined format. Further, the image processor 104 performs display processing on the image subjected to image restoration processing to thereby display a display image on a display section 105. The image processor 104 may display the display image on the display section 105 without performing image restoration processing, or may display the image subjected to simplified image restoration processing on the display section 105.

The system controller 110 controls the overall operation of the camera. For example, the system controller 110 causes the image pickup optical system controller 106 to drive the image pickup optical system 101. In doing this, the image pickup optical system controller 106 controls an opening diameter of the diaphragm 101a according to a photographing state setting of the F number. Further, the image pickup optical system controller 106 controls or drives the focus lens 101b (or controls the focus lens 101b by driving the same) along the optical axis according to an object distance using an auto focus (AF) mechanism (not shown). Note that according to a user's operation, the image pickup optical system controller 106 may control or drive the focus lens 101b (or control the focus lens 101b by driving the same) using a manual focus mechanism (not shown).

Although not shown, the image pickup optical system 101 may be provided with an optical device, such as a low pass filter and an infrared cut filter. When using an optical device that influences the OTF characteristics, such as a low pass filter, it is sometimes beneficial to take into account the characteristics of the optical device when generating the image restoration filter.

Further, when using the infrared cut filter, this filter has an influence on the respective PSFs (point spread functions) of the RGB channels, each of which is a value of integral of the PSF of spectral wavelengths, particularly on the PSF of the R channel, and hence it is also necessary to take this into account when generating the image restoration filter. Although in the illustrated example, the image pickup optical system 101 is shown as a component integrated in the camera, the image pickup optical system 101 may be of an interchangeable type, as in the case of use in a single-lens reflex camera.

FIGS. 2A to 2E are diagrams useful in explaining an example of an image (RAW image) input to the image restoration processor 111 appearing in FIG. 1, in which FIG. 2A shows an RGB plane (Bayer array) of the RAW image, FIGS. 2B to 2D show planes of the respective color components, and FIG. 2E shows a state of a G component plane subjected to interpolation processing.

Referring to FIGS. 2A to 2E, the RAW image composed of pixels each associated with a single-color component (see FIG. 2A) is input to the image restoration processor 111. Here, each single-color component plane has information in a partially missing state (see FIGS. 2B to 2D). Then, as described hereinafter, pixel interpolation is performed on the G component plane, whereby information on the G component is provided for each pixel (see FIG. 2E).

Figure 4:
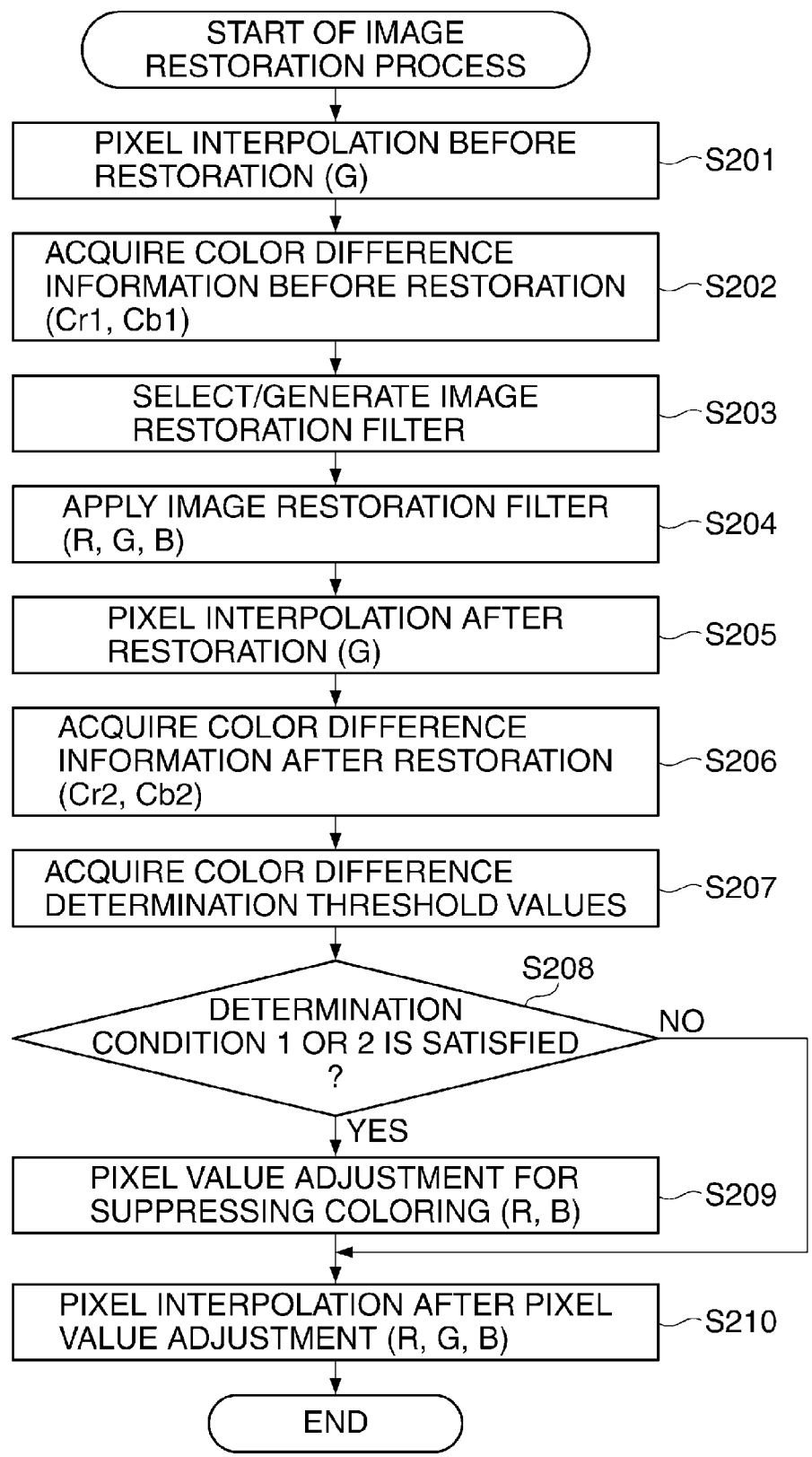
FIG. 4 is a flowchart of an image restoration process performed by the image restoration processor shown in FIG. 3.

FIG. 3 is a block diagram of the image restoration processor 111 appearing in FIG. 1. Further, FIG. 4 is a flowchart of an image restoration process performed by the image restoration processor 111 shown in FIG. 3.

The image restoration process will be described with reference to FIGS. 3 and 4. As described above, the RAW image shown in FIG. 2A is input to the image restoration processor 111. When the image restoration process is started, a pre-restored pixel interpolation section 1001 performs pixel interpolation for the G component plane, and outputs the G component plane after interpolation (step S201). By performing pixel interpolation processing, the G component plane has its information changed from the partially missing state shown in FIG. 2B to a state shown in FIG. 2E in which information on the G component is provided for each pixel.

Then, a first color difference calculation section (R) 1002 calculates first color difference information (Cr1) based on the G component plane after interpolation and the R component plane in the partially missing state (FIG. 2C). Similarly, a first color difference calculation section (B) 1003 calculates first color difference information (Cb1) based on the G component plane after interpolation and the B component plane in the partially missing state (FIG. 2D) (step S202). Note that in this calculation, the color difference is defined as a difference in signal value from the G component as a reference color. Therefore, the color differences are calculated by the following respective equations (6) and (7):

$$C1r(x,y)=R(x,y)-G(x,y) \quad (6)$$

$$C1b(x,y)=B(x,y)-G(x,y) \quad (7)$$

In the equations (6) and (7), (x, y) represents coordinate values on the image, and C1r and C1b represent the color difference of the R component and the B component with respect to the G component, respectively.

Note that the color difference is calculated with respect to not all of the pixels of the image, but only pixels each holding a target color component. More specifically, in calculating C1r(x, y), only the pixels each holding the R component, described with reference to FIG. 2C, are targeted, and in calculating C1b(x, y), only the pixels each holding the B component, described with reference to FIG. 2D, are targeted.

For pixel interpolation processing performed by the image pickup device having the Bayer array, various pixel interpolation methods are known. A generally employed one is an adaptive pixel interpolation processing method for generating interpolated pixels using pixel information of the other color components of the surrounding pixels. For example, to generate an R pixel value for one pixel by performing interpolation processing, a method of interpolating the R pixel value is determined based on the G and B components of the surrounding pixels. Differently from a method of simply linearly interpolating one color component, adaptive pixel interpolation processing can reduce generation of a false color and lowering of sharpness, caused by interpolation processing.

Now, a description will be given of an example of pixel interpolation on an edge portion using the adaptive pixel interpolation processing method.

Figures 5A, 5B:
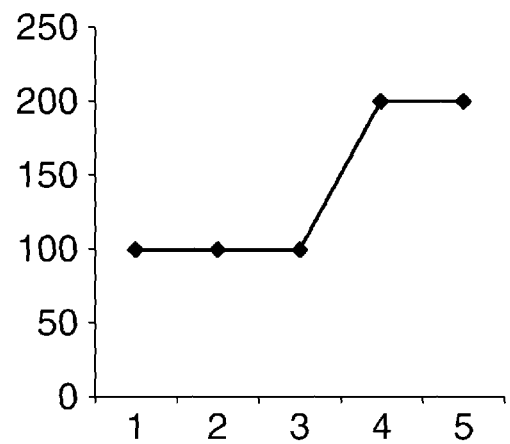

FIGS. 5A and 5B are diagrams useful in explaining the example of pixel interpolation on an edge portion by the adaptive pixel interpolation processing method, in which FIG. 5A shows changes in pixel value (signal value) indicative of brightness on the edge portion, and FIG. 5B shows a pixel array in FIG. 5A.

If the illustrated edge portion is achromatic, when the RGB values in the respective pixels of the image pickup device are obtained, the respective color components of RGB have the same value. In the illustrated example in FIG. 5B, the pixels are in a pixel array composed of the pixel values 100 and 200.

FIGS. 6A to 6I are diagrams useful in explaining the pixel array of the RAW image obtained through photographing using the image pickup device having the Bayer array, in which FIG. 6A shows a G component plane before interpolation, FIG. 6B shows an R component plane before interpolation, FIG. 6C shows a B component plane before interpolation, FIG. 6D shows a G component plane after linear interpolation, FIG. 6E shows an R component plane after linear interpolation, FIG. 6F shows a B component plane after linear interpolation, FIG. 6G shows a G component plane after adaptive interpolation, FIG. 6H shows an R component plane after adaptive interpolation, and FIG. 6I shows a B component plane after adaptive interpolation.

In actuality, the RAW image obtained through photographing by the image pickup device having the Bayer array has one color component for each pixel, and hence when values are extracted for each color component, pixel arrays are as in respective color components planes shown FIGS. 6A to 6C. In the pixel array of each color component plane, pixels indicated by black are those for which interpolation processing is required to be performed. In this case, ideally, the respective color components subjected to pixel interpolation processing have the pixel values shown in FIG. 5B.

In the following description, the pixel arrays shown in FIGS. 6A to 6C are represented by G(x, y), R(x, y), and B(x, y), respectively. In this expression, x represents a coordinate in a horizontal direction, and y represents a coordinate in a vertical direction, both of which are values within a range of 0 to 4.

As described above, the pre-restored pixel interpolation section 1001 performs pixel interpolation processing for the G component. In pixel interpolation, the pre-restored pixel interpolation section 1001 performs adaptive pixel interpolation processing for generating an interpolated pixel using pixel information of the other color components of the surrounding pixels. In the following description, adaptive pixel interpolation processing is simply referred to as adaptive interpolation.

Adaptive interpolation is performed for the G component in the following manner:

To generate the G component for a pixel having a value of the R component (for example, to generate G(1, 2)), the following equations (8) to (11) are used:

$$H\_DIFF = (R(x, y) - R(x - 2, y)) + (R(x, y) - R(x + 2, y)) \quad (8)$$

$$V\_DIFF = (R(x, y) - R(x, y - 2)) + (R(x, y) - R(x, y + 2)) \quad (9)$$

$$IF\ (|H\_DIFF| > |V\_DIFF|)\{G(x, y) = (G(x, y - 1) + G(x, y + 1)/2\} \quad (10)$$

$$ELSE\ \{G(x, y) = (G(X - 1, y) + G(x + 1, y))/2\} \quad (11)$$

By using the equations (8) to (11), a direction of interpolation is determined based on H_DIFF and V_DIFF determined from the R component. This makes it possible to reduce lowering of sharpness caused by interpolation. FIG. 6G shows an example of the G component plane subjected to adaptive interpolation. For comparison, FIG. 6D shows an example of the G component plane subjected to pixel interpolation by general linear interpolation, instead of performing adaptive interpolation.

It is clear from FIGS. 6D and 6G that compared with linear interpolation, adaptive interpolation does not make sharpness lower. Although the above-description is given of an example of generation of the G component for the pixel having a value of the R component, the G component of a pixel having a value of the B component (e.g. G(2, 1)) is similarly generated by interpolation. Note that pixel interpolation processing performed by the pre-restored pixel interpolation section 1001 is not limited to the above-described example, but any other suitable interpolation method may be employed.

Referring again to FIGS. 3 and 4, an image restoration filter-applying section (G) 1004, an image restoration filter-applying section (R) 1005, and an image restoration filter-applying section (B) 1006 select respective image restoration filters suitable for the photographing condition (step S203). In doing this, each selected image restoration filter may be corrected as required. For example, to reduce the number of data items concerning the image restoration filters, which are caused to be recorded in the storage section 108 in advance, data items may be discretely recorded, and before performing image restoration processing, these data items may be corrected according to the photographing condition to thereby generate the image restoration filters.

Further, as mentioned hereinabove, the image restoration filters adapted to the photographing condition may be generated according to data concerning the OTF necessary for generating the image restoration filters.

Then, the image restoration filter application section (G) 1004, the image restoration filter application section (R) 1005, and the image restoration filter application section (B) 1006 perform convolution processing on pixels of the color components (G, R, B) using the image restoration filters, respectively (step S204). This makes it possible to correct the asymmetry of aberration caused in the image pickup optical system 101 and eliminate or reduce the blur components of the image.

Figure 7A:
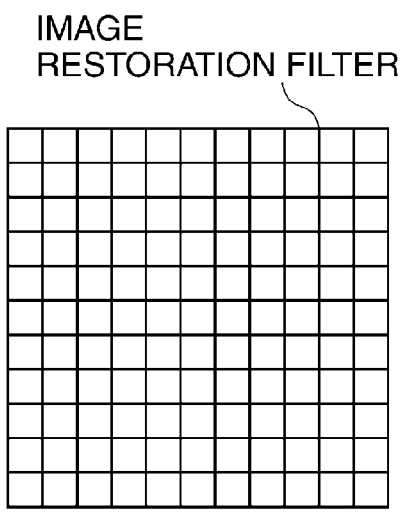
Figure 7B:
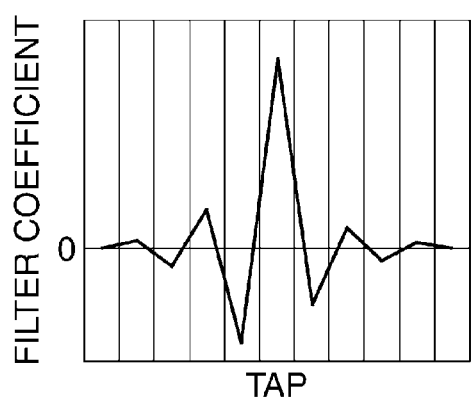

FIGS. 7A and 7B are diagrams useful in explaining an example of the image restoration filter, in which FIG. 7A shows the image restoration filter, and FIG. 7B shows a relationship between taps (terms to be each multiplied by a filter coefficient in the difference equation representative of the filter) and filter coefficients associated with the taps.

The image restoration filter shown in FIG. 7A is an example of an image restoration filter which is to be applied to each color plane of the image in which the pixels each have an associated one of the RGB color components. In the image restoration filter, the number of taps can be determined according to an amount of aberration of the image pickup optical system 101, and the illustrated example shows a two-dimensional filter having 11×11 taps. Each tap of the image restoration filter corresponds to one pixel of the image, and convolution processing is performed in the image restoration process.

As shown in FIG. 7A, a two-dimensional filter which is divided into taps not less than 100 is set as the image restoration filter, whereby it is possible to perform restoration processing even for aberration which occurs in a large area extending from an image formation position, caused by the image pickup optical system 101, such as spherical aberration, coma aberration, axial chromatic aberration, and non-axial color flare.

In FIG. 7A, a filter coefficient of each tap is omitted. FIG. 7B shows filter coefficients of the image restoration filter shown in FIG. 7A, and this image restoration filter can be obtained, as described above, by calculating or measuring the OTF of the image pickup optical system 101, and subjecting the reciprocal of the OTF to inverse Fourier transform. In general, it is necessary to take into account an influence of noise, and hence a method of generating the Wiener filter or an image restoration filter related to the Wiener filter may be selected and used.

Further, the OTF can also include not only factors of the image pickup optical system 101 but also factors that degrade image data input to the image processor 104. For example, the low pass filter suppresses the high-frequency components for the frequency characteristics of the OTF. Further, the shape and aperture ratio of the pixel aperture of the image pickup device also influence the frequency characteristics. Besides, spectral characteristics of a light source and spectral characteristics of various wavelength filters influence the OTF. It is desirable to generate the image restoration filter based on an OTF in a broad sense, in which these factors are included.

Further, in a case where the image is a color image in the RGB format, it is only required to generate three image restoration filters associated with the respective color components of R, G, and B. The image pickup optical system 101 has color aberration, which makes blurring different between the color components, and hence the image restoration filter of each color component is required to make characteristics thereof slightly different depending on color aberration.

Here, the image restoration filter of each color component has slightly different characteristics dependent on color aberration, and hence changes in filter coefficient of the FIG. 7A image restoration filter, illustrated in FIG. 7B, vary with each color component. The numbers of taps of the image restoration filter in the horizontal and vertical directions are not required to be equal, that is, the taps are not required to be squarely arrayed, and the arrangement of taps can be changed as desired only if convolution processing is taken into account.

Figure 8A:
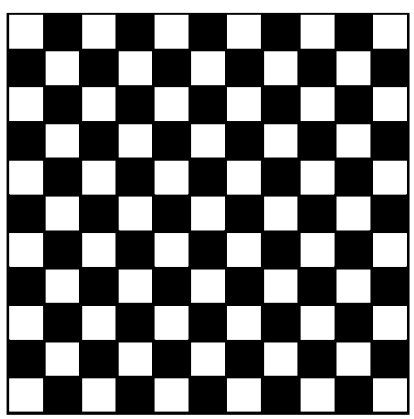
Figure 8B:
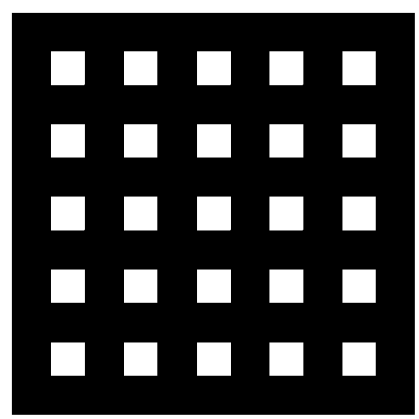

FIGS. 8A and 8B are diagrams useful in explaining an example of the image restoration filter used by the image restoration processor 111 shown in FIG. 3. FIG. 8A shows an example of the image restoration filter to be applied to the G component, and FIG. 8B shows an example of the image restoration filter to be applied to the R and B components.

FIGS. 8A and 8B show the examples of the image restoration filters to be applied to the RAW image having one color component for each pixel. The illustrated image restoration filters are each in a partially missing state in which a coefficient (filter coefficient) is provided only for each pixel having a target color component. In FIGS. 8A and 8B, locations (blocks) each having the filter coefficient are indicated by white, and the other locations each having 0 as the coefficient are indicated by black. When performing image restoration for the three color components of R, G, and B, the image restoration filter shown in FIG. 8A is used as the image restoration filter to be applied to the G component. Further, the image restoration filter shown in FIG. 8B is used as the image restoration filter to be applied to the R and B components.

More specifically, the image restoration filter application section (G) 1004 performs convolution processing for convoluting the G component shown in FIG. 5B with the image restoration filter shown in FIG. 8A. Further, the image restoration filter application section (R) 1005 and the image restoration filter application section (B) 1006 perform convolution processing for convoluting the R and B components shown in FIG. 5B with the image restoration filter shown in FIG. 8B, respectively.

Referring again to FIGS. 3 and 4, a restored pixel interpolation section (G) 1007 performs pixel interpolation for the G component subjected to image restoration (step S205). This interpolation processing is the same as interpolation processing performed by the pre-restored pixel interpolation section 1001, and by performing the interpolation processing, the G component plane is changed from the partially missing state shown in FIG. 2B to the state shown in FIG. 2E, where each pixel has the G component.

Then, a second color difference calculation section (R) 1008 calculates second color difference information (Cr2) based on the G component plane after interpolation (output from the restored pixel interpolation section (G) 1007) and the R component plane in the partially missing state (output from the image restoration filter application section (R) 1005). Similarly, a second color difference calculation section (B) 1009 calculates second color difference information (Cb2) based on the G component plane after interpolation (output from the restored pixel interpolation section (G) 1007) and the B component plane in the partially missing state (output from the image restoration filter application section (B) 1006) (step S206).

Color difference calculation performed in this step is the same as color difference calculation performed by the first color difference calculation section (R) 1002 and the first color difference calculation section (B) 1003, and the color differences are calculated by the following equations (12) and (13):

$$C2r(x,y)=R(x,y)-G(x,y) \quad (12)$$

$$C2b(x,y)=B(x,y)-G(x,y) \quad (13)$$

In the equations (12) and (13), C2$r$ and C2$b$ represent the color difference of the R component and the B component with respect to the G component, respectively.

As described above, the restored pixel interpolation section (G) 1007 performs pixel interpolation only on the G component plane, whereby it is possible to acquire the color difference information after applying the image restoration filter necessary for coloring suppression processing.

Then, a pixel value adjustment section (R) 1010 and a pixel value adjustment section (B) 1011 acquire color difference determination threshold values for use in suppressing coloring, respectively (step S207).

Figure 9:
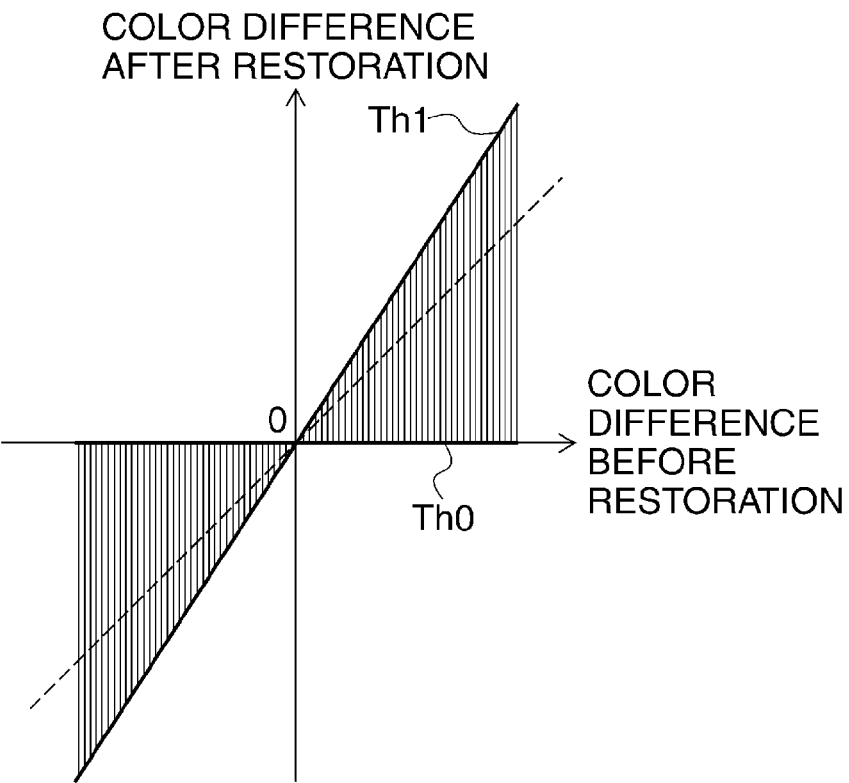
FIG. 9 is a diagram useful in explaining color difference determination threshold values acquired by a pixel value adjustment section appearing in FIG. 3.

FIG. 9 is a diagram useful in explaining the color difference determination threshold values acquired by the pixel value adjustment sections 1010 and 1011 appearing in FIG. 3.

The pixel value adjustment section (R) 1010 and the pixel value adjustment section (B) 1011 acquire first color difference determination threshold values Th0$r$ and Th0$b$, respectively, and second color difference determination threshold values Th1$r$ and Th1$b$, respectively. Note that in FIG. 9, the first and second color difference determination threshold values are indicated by Th0 and Th1, respectively.

The first color difference determination threshold values Th0$r$ and Th0$b$ are color difference determination threshold values to be applied in a case where the color differences C2$r$ and C2$b$ after image restoration are reduced from the color differences C1$r$ and C1$b$ before image restoration, respectively. Further, the second color difference determination threshold values Th1$r$ and Th1$b$ are color difference determination threshold values to be applied when the color differences C2$r$ and C2$b$ after image restoration are increased from the color differences C1$r$ and C1$b$ before image restoration, respectively.

Note that in a case where the color differences C1$r$ and C1$b$ before image restoration are negative values, the first color difference determination threshold values Th0$r$ and Th0$b$ serve as the color difference determination threshold values to be applied when the color differences C2$r$ and C2$b$ after image restoration are increased from the color differences C1r and C1b before image restoration, respectively. Further, the second color difference determination threshold values Th1r and Th1b serve as the color difference determination threshold values to be applied when the color differences C2r and C2b after image restoration are reduced from the color differences C1r and C1b before image restoration, respectively.

These first and second color difference determination threshold values are calculated based on the color differences C1r and C1b before image restoration in each pixel, respectively. As represented by the following equation (14), in this example, the first color difference determination threshold values Th0r and Th0b are each always equal to 0. Further, the second color difference determination threshold values Th1r and Th1b are set by the following equations (15) and (16) based on the color differences C1r and C1b before image restoration, respectively:

$$Th0r = Th0b = 0 \qquad (14)$$

$$Th1r = \alpha \times C1r \qquad (15)$$

$$Th1b = \alpha \times C1b \qquad (16)$$

Next, the pixel value adjustment section (R) 1010 and the pixel value adjustment section (B) 1011 determine, based on the color differences C2r and C2b after image restoration, whether or not adjustment of each pixel value for suppressing coloring is required. In this determination, the pixel value adjustment section (R) 1010 and the pixel value adjustment section (B) 1011 compare the color differences C2r and C2b after image restoration with the first color difference determination threshold values Th0r and Th0b and the second color difference determination threshold values Th1r and Th1b, and determine based on the comparison results whether or not each color difference satisfies conditions based on the associated color difference determination threshold values (step S208). More specifically, the determination is performed based on the following determination conditions 1 and 2 as to the R and B components, and if one of the conditions is satisfied, the pixel value adjustment for suppressing coloring is performed for the pixels of the color component associated therewith (step S209).

If $C1r \geq 0$ holds, the following determination is performed for the R component:

$C2r < Th0r$      determination condition 1:

$C2r > Th1r$      determination condition 2:

If $C1r < 0$ holds, the following determination is performed for the R component:

$C2r > Th0r$      determination condition 1:

$C2r < Th1r$      determination condition 2:

If $C1b \geq 0$ holds, the following determination is performed for the B component:

$C2b < Th0b$      determination condition 1:

$C2b > Th1b$      determination condition 2:

If $C1b < 0$ holds, the following determination is performed for the B component:

$C2b > Th0b$      determination condition 1:

$C2b < Th1b$      determination condition 2:

If one of the determination conditions 1 and 2 is satisfied (YES to the step S208), the pixel value adjustment section (R) 1010 and the pixel value adjustment section (B) 1011 perform pixel adjustment for suppressing coloring. Here, each pixel value is adjusted such that the color differences C2r and C2b become equal to the first color difference determination threshold values Th0r and Th0b, respectively, or to the second color difference determination threshold values Th1r and Th1b, respectively, in the following manner:

Pixel value adjustment with respect to the R component

If the determination condition 1 is satisfied, the pixel adjustment is performed by the following equation (17):

$$R(x,y) = G(x,y) + Th0r(x,y) \qquad (17)$$

If the determination condition 2 is satisfied, the pixel adjustment is performed by the following equation (18):

$$R(x,y) = G(x,y) + Th1r(x,y) \qquad (18)$$

Pixel value adjustment with respect to the B component

If the determination condition 1 is satisfied, the pixel adjustment is performed by the following equation (19):

$$B(x,y) = G(x,y) + Th0b(x,y) \qquad (19)$$

If the determination condition 2 is satisfied, the pixel adjustment is performed by the following equation (20):

$$B(x,y) = G(x,y) + Th1b(x,y) \qquad (20)$$

As easily understood from the equations (14) to (20), when the coefficient α is large, an allowable range of the color difference after image restoration is increased, and hence a correction amount of the signal value after image restoration becomes small, whereby a change in the color tone is reduced. This coefficient α is set according to an amount of noise of the image pickup device 102 (i.e. an amount of noise superimposed on the image). For example, the system controller 110 sets the coefficient α according to the ISO sensitivity information correlated with the noise amount, as feature amount information concerning an image feature amount.

Figure 10:
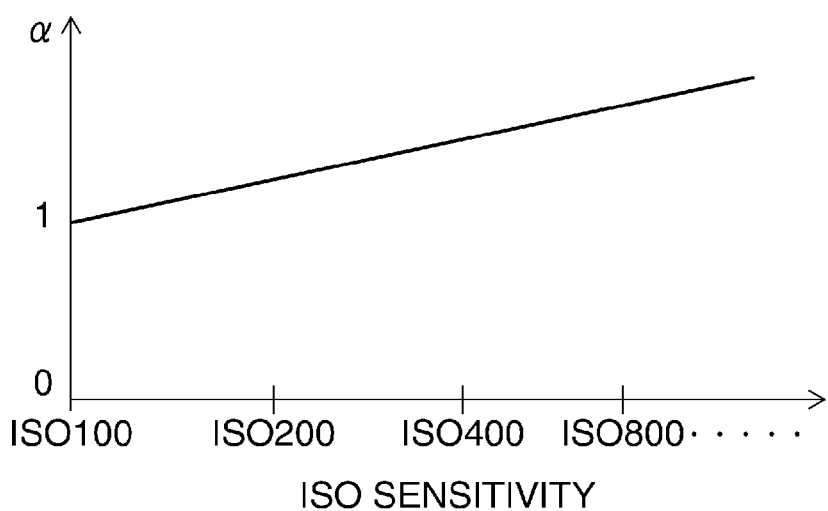
FIG. 10 is a diagram showing an example of coefficients each set according to an ISO sensitivity correlated with an amount of noise of the image pickup device appearing in FIG. 1.

FIG. 10 is a diagram showing an example of setting of the coefficient α according to the ISO sensitivity correlated with an amount of noise of the image pickup device 102 appearing in FIG. 1.

Referring to FIG. 10, when the ISO sensitivity is equal to 100, the coefficient α is set to 1, and as the ISO sensitivity becomes higher, the coefficient α is linearly increased. This makes it possible to reduce a change in the color tone caused by coloring suppression processing.

Note that if the coefficient α is too large, an effect of suppressing coloring generated on an object which is out of focus is reduced, and hence it is desirable that the coefficient α is empirically determined taking into account the coloring suppression effect, described hereinafter, and noise characteristics of the image pickup device 102.

Then, a pixel value-adjusted pixel interpolation section 1012 performs pixel interpolation processing on the respective color components of R, G, and B, on which pixel value adjustment for suppressing coloring has been performed by applying the respective associated image restoration filters (step S210). More specifically, the pixel value-adjusted pixel interpolation section 1012 performs pixel interpolation processing on an output from the image restoration filter application section (G) 1004, an output from the pixel value adjustment section (R) 1010, and an output from the pixel value adjustment section (B) 1011. Note that if neither the determination conditions 1 or 2 is satisfied in the step S208 (NO to the step S208), the process directly proceeds to the step S210.

In this step, adaptive interpolation for generating an interpolated pixel using pixel information of the other surrounding pixels is performed. This makes it possible to perform pixel interpolation processing mutually using the color components on which coloring suppression processing has been performed. Note that for pixel interpolation processing performed by the pixel value-adjusted pixel interpolation section 1012, it is possible to employ the same method as employed for pixel interpolation processing performed by the pre-restored pixel interpolation section (G) 1001.

Now, a description will be given of adaptive interpolation for generating, for the R component before interpolation shown in FIG. 6B, an interpolated pixel using pixel information of the other color components of the surrounding pixels, by way of example.

The pixel value-adjusted pixel interpolation section 1012 performs adaptive interpolation for the R component using the G component interpolated in advance, by the following equations (21) to (26).

In a case where adjacent pixels on horizontally opposite sides have values (e.g. R(2, 0))

$$Cr = (R(x-1,y) - G(x-1,y) + R(x+1,y) - G(x+1,y))/2 \quad (21)$$

$$R(x,y) = G(x,y) + Cr \quad (22)$$

In a case where adjacent pixels on vertically opposite sides have values (e.g. R(1, 1))

$$Cr = (R(x,y-1) - G(x,y-1) + R(x,y+1) - G(x,y+1))/2 \quad (23)$$

$$R(x,y) = G(x,y) + Cr \quad (24)$$

In a case where adjacent pixels on diagonally opposite sides have values (e.g. R(2, 1))

$$Cr = (R(x-1,y-1) - G(x-1,y-1) + R(x+1,y-1) - G(x+1,y-1) + R(x-1,y+1) - G(x-1,y+1) + R(x+1,y+1) - G(x+1,y+1))/4 \quad (25)$$

$$R(x,y) = G(x,y) + Cr \quad (26)$$

The pixel value-adjusted pixel interpolation section 1012 thus performs adaptive interpolation by interpolating the R component with the color difference information (R-G) acquired from the adjacent pixels.

Similarly to adaptive interpolation performed for the R component, adaptive interpolation for the B component shown in FIG. 6C is performed by applying one of the above-mentioned three patterns according to the adjacent pixels to thereby interpolate the B component with the color difference information (B-G) acquired from the adjacent pixels.

FIGS. 6G to 6I show examples of the respective color planes of the color components on which adaptive interpolation has been performed. Note that for the purpose of comparison, FIGS. 6D to 6F show examples of the respective color planes of the color components on which linear interpolation has been performed, instead of performing adaptive interpolation.

As shown in FIGS. 6D to 6F, in the case where linear interpolation has been performed, the pixel values other than "100" and "200" are generated, and the sharpness is reduced with respect to the pixel array shown in FIG. 5B. On the other hand, in the case where adaptive interpolation has been performed, the pixel arrays shown in FIGS. 6G to 6I are equal in pixel values between the components of R, G, and B, and all coincide with the pixel array shown in FIG. 5B.

As described above, by performing adaptive interpolation for generating an interpolated pixel using pixel information of other color components of surrounding pixels, it is possible to generate an image in which sharpness is not reduced with respect to the pixel array shown in FIG. 5B.

Note that pixel interpolation processing performed by the pixel value-adjusted pixel interpolation section 1012 is not particularly limited, but any other suitable adaptive interpolation method can be employed insofar as it is a method of generating an interpolated pixel using pixel information of the other color components of surrounding pixels.

When the step S210 is finished, the image processor 104 terminates the image restoration process, and performs the process by the other image processor 112.

Note that the OTF varies according to an angle of view (image height) of the image pickup optical system even under one photographing condition, and hence it is desirable to change image restoration processing for each of divided areas of the image according to the image height. For example, the image restoration filter is only required to be scanned on the image while performing convolution processing, and the image restoration filter may be sequentially changed for each area. That is, the step S203 is performed on each target pixel of the image restoration components.

Although in the first embodiment of the present invention, application of the image restoration filter is described as the image restoration process, this is not limitative. For example, the image restoration process may be performed by combining the same with another process, such as a distortion correction process, a peripheral light amount correction process, and a noise reduction process, before or after or during the process in FIG. 4.

Figure 11A:
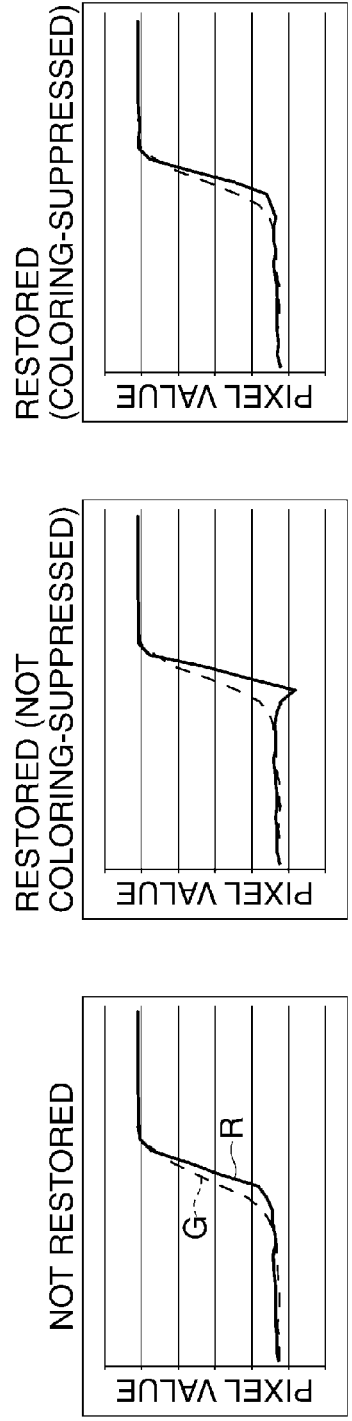
Figure 11B:
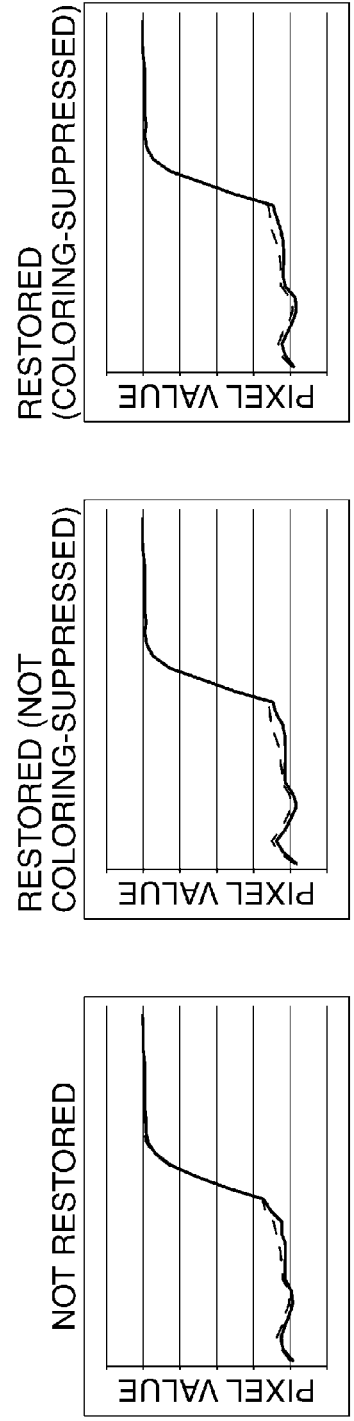

FIGS. 11A and 11B are diagrams useful in explaining changes in pixel value (signal value) indicative of brightness in an edge portion in a case where development processing is performed on an image subjected to the image restoration process, described with reference to FIG. 4 and an image not subjected to the image restoration process. FIG. 11A shows changes in brightness at a low sensitivity, and FIG. 11B shows changes in brightness at a high sensitivity.

FIG. 11A shows an example of a case of low sensitivity, and the image has less noise which is a cause of a change in the color tone by coloring suppression processing in image restoration. In the illustrated example in FIG. 11A, the edge is an edge of an object which is out of focus, and with respect to the pixel value (signal value) of the edge without image restoration process (no restoration), unless coloring suppression processing is performed, coloring in the edge portion is increased by performing image restoration.

Figure 12A:
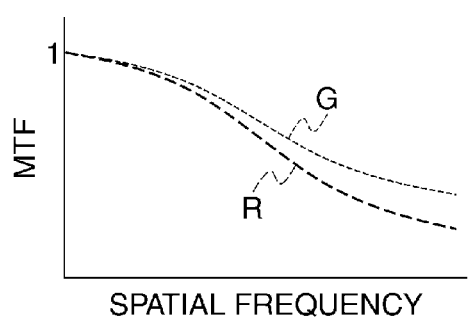
FIGS. 12A to 12E are diagrams useful in explaining a relationship between MTF and spatial frequency characteristics, in which FIGS. 12A to 12D each show a relationship between MTF of an image pickup optical system and spatial frequency characteristics exhibited after applying the image restoration filter.
Figure 12B:
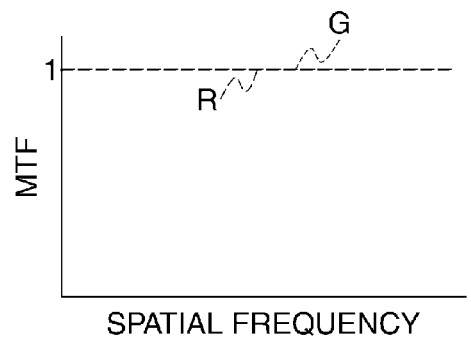
Figure 12C:
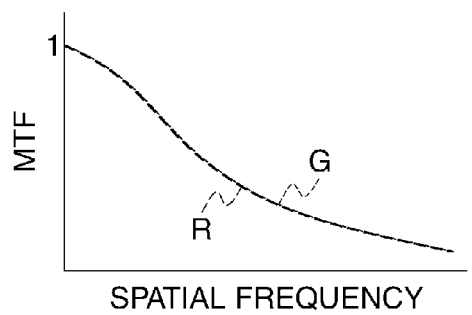
Figure 12D:
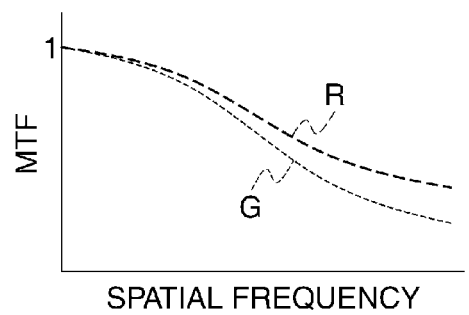
Figure 12E:
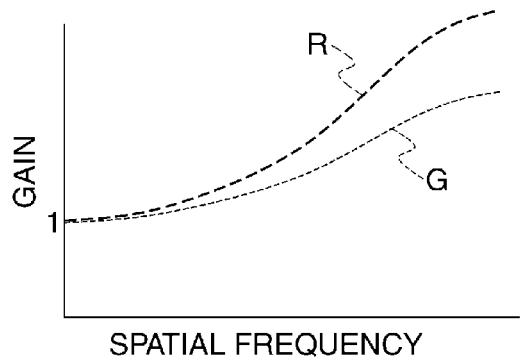

FIGS. 12A to 12E are diagrams useful in explaining a relationship between the MTF and spatial frequency characteristics. FIGS. 12A to 12D each show the relationship between the MTF of the image pickup optical system and the spatial frequency characteristics exhibited after applying the image restoration filter, and FIG. 12E shows an increase/decrease rate (restoration gain) of the MTF caused by applying the image restoration filter.

FIG. 12A shows the MTFs of the image pickup optical system 101 in an in-focus state, in which the R component is degraded more than the G component. FIG. 12B shows the MTFs obtained after applying the image restoration filter in the in-focus state, in which the G component and the R component are both have their MTF properly corrected, and coincide with each other.

More specifically, in the illustrated example in FIG. 12B, the MTFs shown in FIG. 12A are multiplied by the restoration gains shown in FIG. 12E, respectively, whereby the MTFs of the G component and the R component are both properly corrected to coincide with each other. The image restoration filter is designed to be capable of optimally performing image restoration processing with respect to an object which is in focus, which makes it possible to properly perform image restoration processing in the in-focus state. Therefore, when the object is in focus, blurs of the G component and the R component are properly eliminated, and color bleeding is also eliminated.

On the other hand, FIGS. 12C and 12D show the MTFs of the image pickup optical system 101 in a non-focusing state, in which the G component and the R component both show different characteristics, compared with those shown in FIG. 12A. The edge portion shown in FIG. 11A corresponds to the MTFs shown in FIG. 12D.

When the MTF shown in FIG. 12D is multiplied by the restoration gain shown in FIG. 12E, the R component is excessively corrected, and as a result, coloring occurs in the edge portion on which restoration processing has been performed, as described with reference to FIGS. 11A and 11B. This coloring is suppressed by performing the above-described image restoration process. That is, since the sensitivity is low, the coefficient α is set to a smaller value than when the sensitivity is high, such that coloring suppression can be sufficiently performed.

In the illustrated example in FIG. 11B, the sensitivity is high, and the RAW image has a lot of noise. In this case, it can be said that image information obtained from the optical image formed on the image pickup device is lost due to noise. Therefore, coloring occurring on the object out of focus, which is found when the sensitivity is low, has its degree reduced when the sensitivity is high. Further, coloring occurring in the edge portion is sometimes made unnoticeable by noise reduction processing performed in development processing.

That is, coloring occurring in an object out of focus tends to be less noticeable in the case of the high sensitivity, and hence the coefficient α is set to a larger value in this case than in the case of the low sensitivity to thereby reduce a change in the color tone caused by coloring suppression processing. This makes it possible to perform proper coloring suppression processing when the sensitivity is high.

Figure 13:
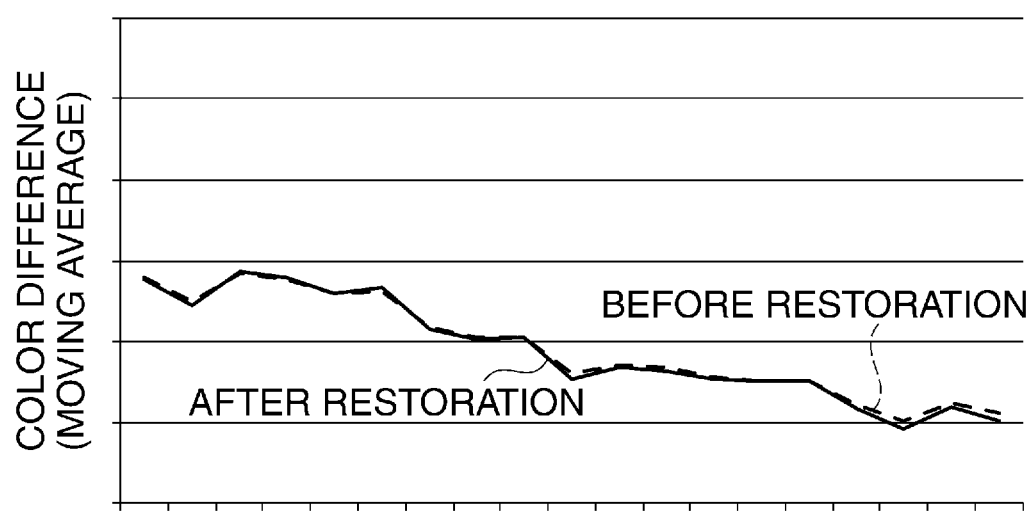
FIG. 13 is a diagram showing moving averages of respective color differences before and after image restoration along one line in a predetermined area of an image having a lot of noise.

FIG. 13 is a diagram showing moving averages of respective color differences before and after image restoration along one line in a predetermined area of an image having a lot of noise.

Figure 20A:
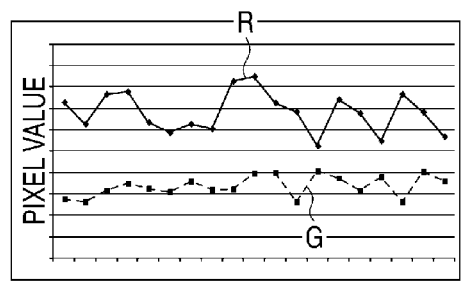
Figure 20B:
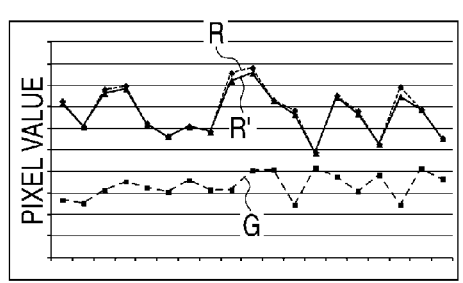
Figure 20C:
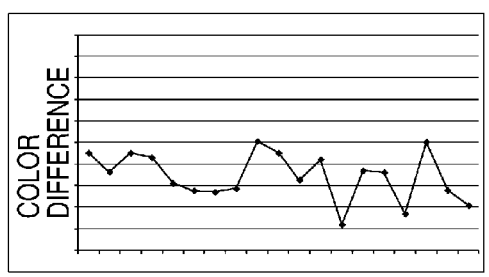
Figure 20D:
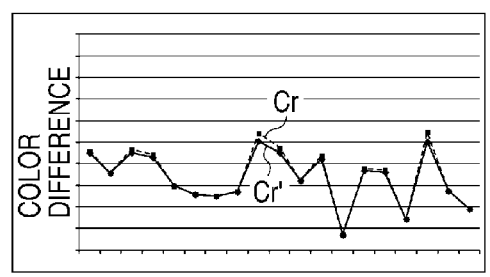
Figure 20E:
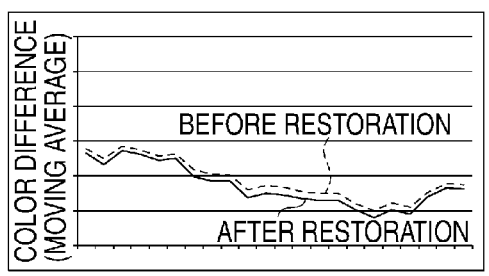

It is assumed that a brightness of an object is low and a change in color is small in the predetermined area. It is clear from FIG. 13 that when the image restoration process described with reference to FIG. 4 is performed, the color tone is hardly changed, compared with the state described with reference to FIG. 20E.

As described above, by setting the color difference determination threshold values according to the ISO sensitivity, it is possible to perform proper coloring suppression processing on an image having a lot of noise.

Although in the step S207 described with reference to FIG. 4, the system controller 110 outputs the ISO sensitivity correlated with the amount of noise as the image feature amount, a characteristics feature amount concerning the characteristics of the image restoration filter may be output in place of the image feature amount.

Figure 14:
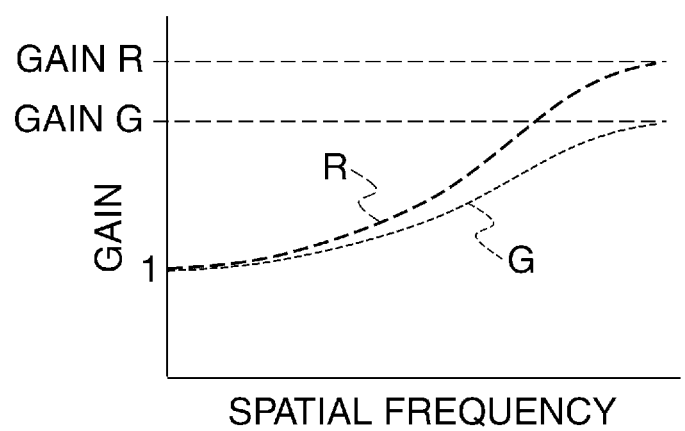
FIG. 14 is a diagram showing characteristics of restoration gains for G and R components.

FIG. 14 is a diagram showing characteristics of the restoration gain used in the G and R components.

Referring to FIG. 14, Gain R and Gain G represent the maximum values of the restoration gain used for the G and R components, respectively. In general, as the restoration gain is larger, the noise component is also amplified. Therefore, in this example, the coefficient α is set according to the magnitude of the restoration gain.

Figure 15:
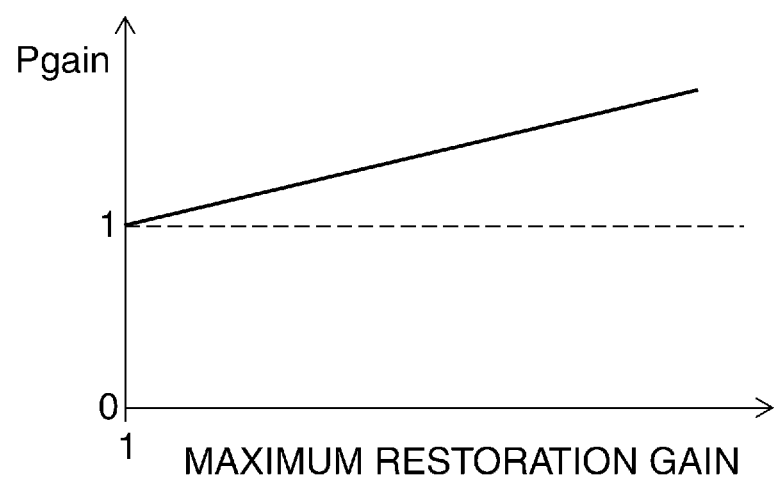
FIG. 15 is a diagram showing a relationship between the maximum restoration gain and a parameter associated therewith.

FIG. 15 is a diagram showing a relationship between the maximum restoration gain and a parameter Pgain.

As shown in FIG. 15, when the maximum restoration gain is equal to "1", the parameter Pgain is equal to "1", and as the maximum restoration gain increases, the parameter Pgain linearly increases. The larger one of Gain R and Gain G, indicated in FIG. 14, is set as the maximum restoration gain, and the parameter Pgain corresponding to the maximum restoration gain is obtained from the relationship shown in FIG. 15. The parameter Pgain is substituted for the coefficient α, and the second color difference determination threshold values Th$1r$ and Th$1b$ are determined using the equations (15) and (16), respectively.

Further, a coefficient α' is calculated according to the following equation (27) with respect to the coefficient α set according to the ISO sensitivity, and by substituting the coefficient α' for the coefficient α, the second color difference determination threshold values Th$1r$ and Th$1b$ may be determined by the equations (15) and (16), respectively.

$$\alpha' = \alpha \times P\text{gain} \qquad (27)$$

By thus performing coloring suppression processing according to the magnitude of the restoration gain, it is possible to reduce a change in the color tone in an area in which a change in the color tone is liable to be caused by coloring suppression processing.

As described above, in the first embodiment, the color difference determination threshold values are set according to the predetermined condition, whereby it is possible to properly suppress coloring caused by image restoration processing.

Next, a description will be given of a camera as an image pickup apparatus equipped with an image processing apparatus according to a second embodiment of the present invention. The camera according to the second embodiment has the same configuration as the camera shown in FIG. 1 except an image restoration processor described in the following.

Figure 16:
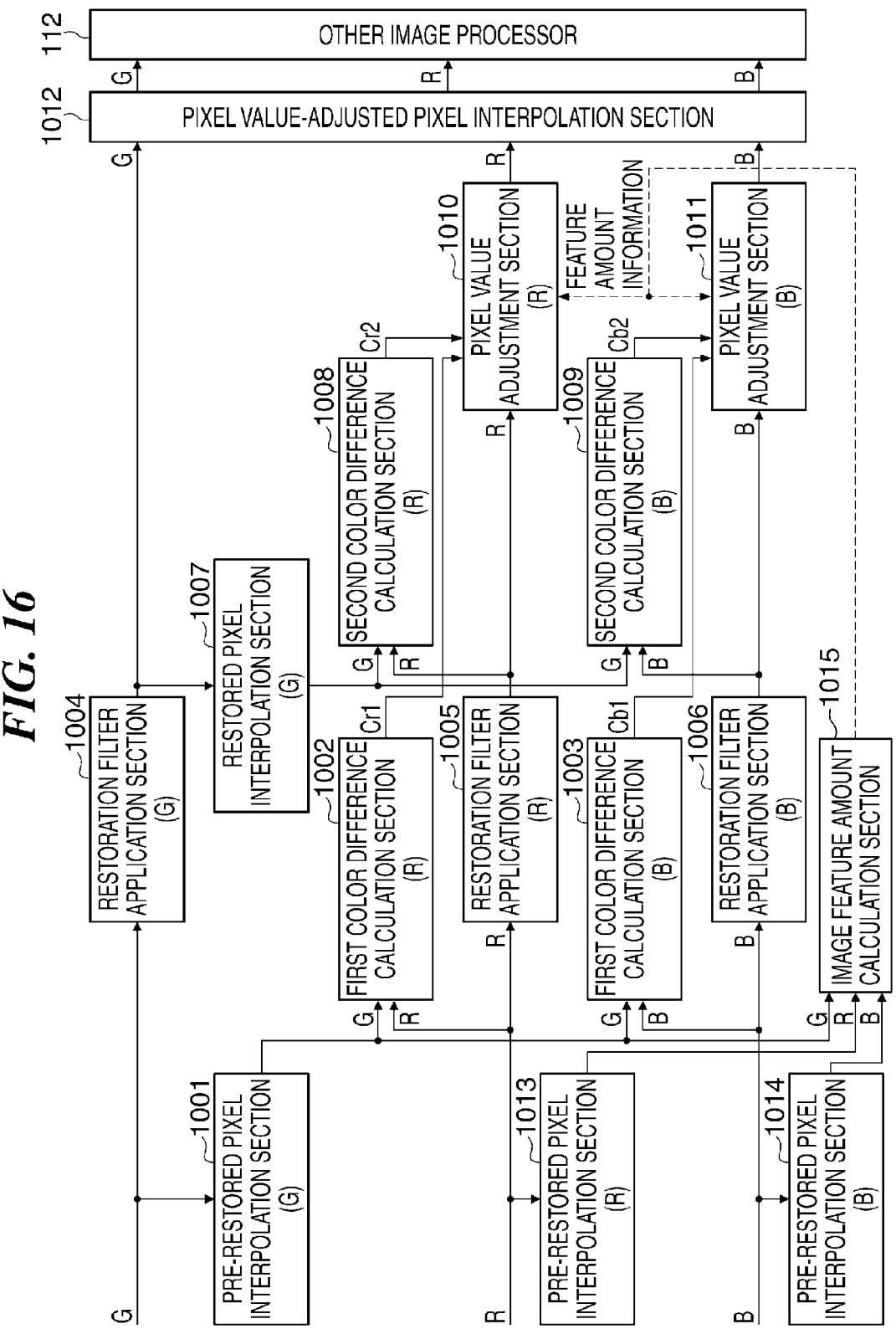
FIG. 16 is a block diagram of an image restoration processor included in an image processor of a digital camera as an image pickup apparatus equipped with an image processing apparatus according to a second embodiment of the present invention.

FIG. 16 is a block diagram of the image restoration processor included in the image processor 104 of the camera as the image pickup apparatus equipped with the image processing apparatus according to the second embodiment. In FIG. 16, the same components as those of the image restoration processor 111 shown in FIG. 3 are denoted by the same reference numerals, and description thereof is omitted.

In the image restoration processor shown in FIG. 16, the ISO sensitivity or the characteristics of the image restoration filter is/are not used as the feature amount information, but a feature amount is obtained from an image, and the coefficient α is set according to the obtained feature amount.

The image restoration processor shown in FIG. 16 includes (as differences from the embodiment of FIG. 3) a pre-restored pixel interpolation section (R) 1013, a pre-restored pixel interpolation section (B) 1014, and an image feature amount calculation section 1015. The pre-restored pixel interpolation section (R) 1013 and the pre-restored pixel interpolation section (B) 1014 perform pixel interpolation processing for the R component and the B component in the similar manner to processing performed by the pre-restored pixel interpolation section (G) 1001 to the G component.

The RGB signals (R signal, G signal, B signal) output from the pre-restored pixel interpolation section (G) 1001, the pre-restored pixel interpolation section (R) 1013, and the pre-restored pixel interpolation section (B) 1014, on which pixel interpolation has been performed, are input to the image feature amount calculation section 1015. The image feature amount calculation section 1015 calculates hue, saturation, and brightness of each pixel based on the RGB signals. The image feature amount calculation section 1015 converts the hue, saturation, and brightness into an HSB color space using a predetermined conversion equation.

Figure 17A:
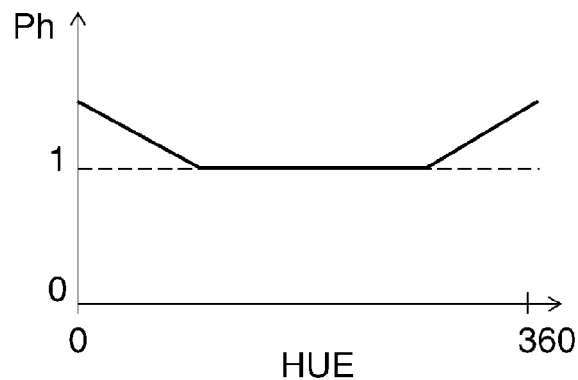
FIGS. 17A to 17C are diagrams showing examples of relationships between, respectively, hue, saturation, and brightness of an image, and respective parameters.
Figure 17B:
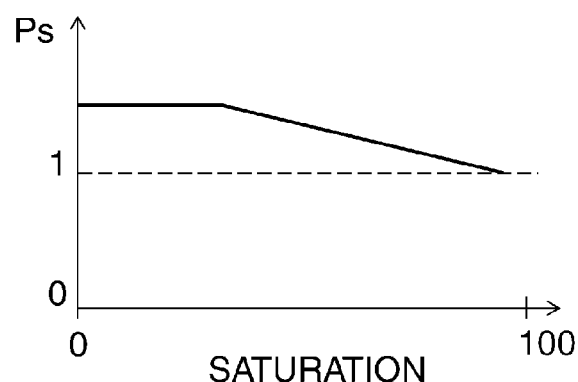
Figure 17C:

FIGS. 17A to 17C are diagrams showing an example of respective relationships between the hue, saturation, and brightness of an image, and parameters Ph, Ps, and Pb, respectively.

As shown in FIGS. 17A to 17C, as the hue increases from a value of 0, the parameter Ph decreases, and reaches Ph=1. After that, even when the hue increases, the parameter Ph remains at Ph=1 for some range of hue. When the hue further increases beyond this range, the parameter Ph linearly increases.

As for the saturation, even when the saturation increases from 0, the parameter Ps remains at a fixed value, but when the saturation reaches a predetermined value, the parameter Ps starts to gradually decrease to Ps=1. As for the brightness, the parameter Pb changes with respect to brightness in substantially the same manner as Ps does with respect to saturation.

The image feature amount calculation section 1015 obtains the parameters Ph, Ps, and Pb corresponding to the hue, saturation, and brightness respectively from the diagrams shown in FIGS. 17A to 17C which illustrate the relationship between the hue, saturation, and brightness of an image, and parameters Ph, Ps, and Pb. Then, the image feature amount calculation section 1015 calculates, using the obtained parameters Ph, Ps, and Pb, a parameter Phsb as the image feature amount, from the following equation (28):

$$Phsb = Ph \times Ps \times Pb \qquad (28)$$

The pixel value adjustment section (R) 1010 and the pixel value adjustment section (B) 1011 determine the second color difference determination threshold values Th1$r$ and Th1$b$, by substituting the parameter Phsb for the coefficient $\alpha$, and using the equations (15) and (16), respectively.

Alternatively, the pixel value adjustment section (R) 1010 and the pixel value adjustment section (B) 1011 may calculate the coefficient $\alpha$ according to the ISO sensitivity in the manner described in the first embodiment. Then, the pixel value adjustment section (R) 1010 and the pixel value adjustment section (B) 1011 may calculate the coefficient $\alpha'$ based on the coefficient $\alpha$ by the following equation (29), and calculate the second color difference determination threshold values Th1$r$ and Th1$b$ based on the coefficient $\alpha'$ using the equations (15) and (16), respectively:

$$\alpha' = \alpha \times Phsb \qquad (29)$$

By performing coloring suppression processing according to the hue, saturation, and brightness of the image, as described above, it is possible to reduce a change in the color tone in the coloring suppression processing in a manner specializing a color for which a change in color tone is noticeable, such as a human skin color.

Although color reproduction processing is performed in developing the image after image restoration processing, how a change in color difference caused by image restoration processing contributes to the color tone of the final image changes depending on color reproduction processing. Therefore, it is possible to set the color difference determination threshold values according to a color which sensitively influences the change in the color tone of the final image (a certain area in the color space) in color reproduction processing.

Further, although it is described hereinabove that the noise component is a cause of a change in the color tone in coloring suppression processing, image restoration processing is performed on an image on which white balance processing has been performed, and hence the noise component is varied by the RGB gain values used in white balance processing. This means that the magnitude of the noise component varies with color. Therefore, it is possible to set the color difference determination threshold values according to a color for which noise is increased by white balance processing.

In the above-described example, the image feature amount calculation section 1015 calculates the image feature amount based on the hue, saturation, and brightness. On the other hand, when calculating the image feature amount, edge intensity indicative of a magnitude of variation in pixel value in an edge portion may be used. Note that the edge intensity can be determined by applying e.g. a known differential filter to an image.

Figure 18:
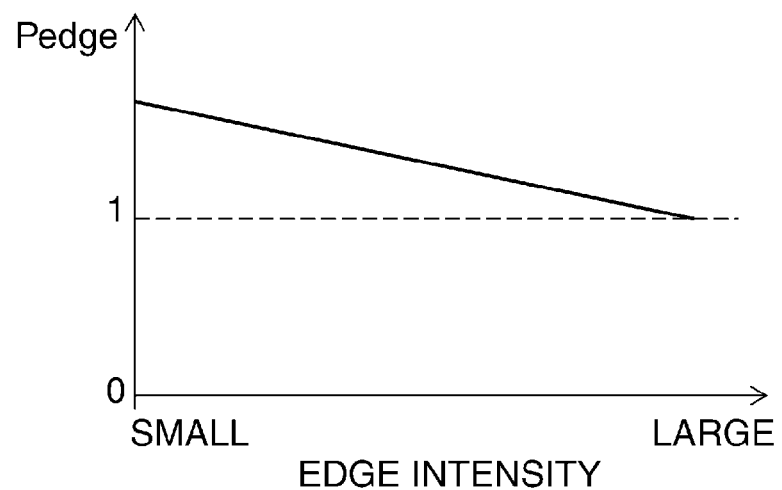
FIG. 18 is a diagram showing an example of a relationship between edge intensity and a parameter associated therewith.

FIG. 18 is a diagram showing an example of a relationship between the edge intensity and a parameter Pedge.

As shown in FIG. 18, the parameter Pedge gradually decreases as the edge intensity increases. The image feature amount calculation section 1015 determines the parameter Pedge dependent on the edge intensity, as the image feature amount, from the relationship between the edge intensity and the parameter Pedge, shown in FIG. 18.

Next, the pixel value adjustment section (R) 1010 and the pixel value adjustment section (B) 1011 determine the second color difference determination threshold values Th1$r$ and Th1$b$ by substituting the parameter Pedge for the coefficient $\alpha$ and using the equations (15) and (16), respectively.

Alternatively, the pixel value adjustment section (R) 1010 and the pixel value adjustment section (B) 1011 may calculate coefficient $\alpha''$ by multiplying the coefficient $\alpha'$ calculated by the above equation (29), by the parameter Pedge, as represented by the following equation (30). Then, the pixel value adjustment section (R) 1010 and the pixel value adjustment section (B) 1011 may calculate the second color difference determination threshold values Th1$r$ and Th1$b$ based on the coefficient $\alpha''$ using the equations (15) and (16), respectively.

$$\alpha'' = \alpha' \times Pedge \qquad (30)$$

Taking into account the fact that coloring occurring on an object out of focus in image restoration processing is noticeable mainly at an edge portion, the second color difference determination threshold values Th1$r$ and Th1$b$ may be set according to the edge intensity. By doing so, it is possible to perform processing such that occurrence of coloring in the edge portion is suppressed and a change in the color tone in a flat portion, caused by coloring suppression processing, is reduced.

Although in the above-described example, the first color difference determination threshold values Th0$r$ and Th0$b$ are always equal to 0, the first color difference determination threshold values Th0$r$ and Th0$b$ are not necessarily required to be equal to 0.

Figure 19:
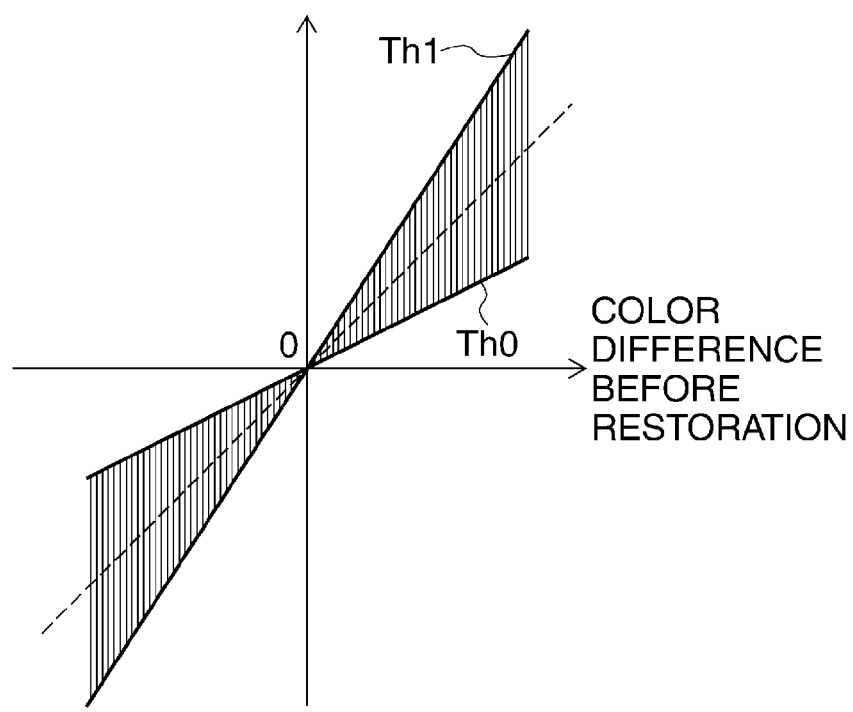
FIG. 19 is a diagram useful in explaining color difference determination threshold values used by the digital camera as the image pickup apparatus equipped with the image processing apparatus according to the second embodiment.

FIG. 19 is a diagram showing the color difference determination threshold values used by the camera as the image pickup apparatus equipped with the image processing apparatus according to the second embodiment.

Referring to FIG. 19, the first color difference determination threshold values Th0r and Th0b are determined based on the coefficient for the first color difference determination threshold values Th0r and Th0b, similarly to the second color difference determination threshold values Th1r and Th1b set using the coefficient α.

By setting the first color difference determination threshold values Th0r and Th0b as above, a difference in color difference suppression amount occurring when the color difference increases and decreases becomes small, and hence a change in the color tone becomes smaller. In this case, this reduces the effect of color bleeding correction by image restoration, and hence it is desirable to set the first color difference determination threshold values Th0r and Th0b in a manner combined with the threshold value setting according to the above-mentioned edge intensity, by taking into account the characteristics of the image pickup optical system used for photographing.

As described above, also in the second embodiment of the present invention, it is possible to properly suppress coloring caused by image restoration processing.

Although in the above-described embodiments, pixel interpolation is performed only with respect to the G component out of the RGB components input to the respective color difference calculation sections, a color difference of each pixel may be determined by performing pixel interpolation with respect to all of the RGB components.

As is clear from the above description, in the illustrated example in FIG. 3, the pre-restored pixel interpolation section (G) 1001, the first color difference calculation section (R) 1002, and the first color difference calculation section (B) 1003 function as a first calculation unit, the image restoration filter application section (G) 1004, the image restoration filter application section (R) 1005, and the image restoration filter application section (B) 1006 function as a restoration processing unit. Further, the restored pixel interpolation section (G) 1007, the second color difference calculation section (R) 1008, and the second color difference calculation section (B) 1009 function as a second calculation unit, and the pixel value adjustment section (R) 1010 and the pixel value adjustment section (B) 1011 function as a correction unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-091349 filed Apr. 25, 2014, which is hereby incorporated by reference herein in its entirety.

What is claimed is:

1. An image processing apparatus comprising at least one processor that functions as:
    a first calculation unit configured to calculate a feature amount of a color of pixels in first image data obtained according to an optical image formed on an image pickup device via an image pickup optical member, as a first color feature amount;
    a restoration processing unit configured to perform restoration processing on the first image data, using a restoration filter for improving image quality degraded due to the image pickup optical member, to thereby generate second image data;
    a second calculation unit configured to calculate a feature amount of a color of pixels in the second image data as a second color feature amount; and
    a correction unit configured to correct pixel values of the second image data according to a result of comparison between an amount of change in the second color feature amount with respect to the first color feature amount, and a threshold value,
    wherein said correction unit is configured to change the threshold value based on an edge intensity of the first image data such that the threshold value decreases as the edge intensity increases.

2. The image processing apparatus according to claim 1, wherein said correction unit is configured to change the threshold value based on a gain applied when generating the first image data.

3. The image processing apparatus according to claim 2, wherein said correction unit is further configured to change the threshold value based on an ISO sensitivity applied when generating the first image data.

4. The image processing apparatus according to claim 2, wherein said correction unit is further configured to change the threshold value based on a gain applied in white balance processing performed when generating the first image data.

5. The image processing apparatus according to claim 1, wherein said correction unit is configured to change the threshold value based on at least one of hue, saturation and brightness.

6. The image processing apparatus according to claim 1, wherein said correction unit is configured to set the threshold value by multiplying the first color feature amount by a coefficient.

7. The image processing apparatus according to claim 1, wherein said correction unit is configured to change the coefficient based on the edge intensity.

8. The image processing apparatus according to claim 1, wherein, in a case where the amount of change exceeds the threshold value, said correction unit is configured to correct the pixel values of the second image data such that the amount of change will not exceed the threshold value.

9. The image processing apparatus according to claim 1, further comprising an interpolation unit configured to perform interpolation processing on the second image data corrected by said correction unit, on a color-by-color basis.

10. The image processing apparatus according to claim 1, wherein the first color feature amount and the second color feature amount are color difference signals.

11. The image processing apparatus according to claim 10, wherein said first calculation unit is configured to perform interpolation processing only on pixel values of a first color out of a plurality of colors included in the first image data, and to calculate the first color feature amount based on a difference between a pixel value of a color other than the first color and a pixel value of the first color, and
wherein said second calculation unit is configured to perform interpolation processing only on pixel values of the first color out of a plurality of colors included in the second image data, and to calculate the second color feature amount based on a difference between a pixel value of a color other than the first color and a pixel value of the first color.

12. The image processing apparatus according to claim 11, wherein said first calculation unit comprises one calculation unit and another calculation unit, and the first color feature amount comprises one first color feature amount and another first color feature amount calculated by said one calculation unit and said another calculation unit, respectively,
wherein a first color is a green component,
wherein said one calculation unit is configured to calculate a difference between a pixel value of a red component and a pixel value of the green component as the one first color feature amount, and
wherein said another calculation unit is configured to calculate a difference between a pixel value of a blue component and a pixel value of the green component as the other first color feature amount.

13. The image processing apparatus according to claim 1, wherein the first image data includes pixel values corresponding to a green component, a red component, and a blue component.

14. The image processing apparatus according to claim 1, wherein the first calculation unit, the restoration unit, the second calculation unit and the correction unit, are implemented by at least one processor executing at least one program recorded on at least one non-transitory memory device.

15. An image processing method comprising:
calculating a feature amount of a color of pixels in first image data obtained according to an optical image formed on an image pickup device via an image pickup optical member, as a first color feature amount;
performing restoration processing on the first image data, using a restoration filter for improving image quality degraded due to the image pickup optical member, to thereby generate second image data;
calculating a feature amount of a color of pixels in the second image data as a second color feature amount; and
correcting pixel values of the second image data according to a result of comparison between an amount of change in the second color feature amount with respect to the first color feature amount, and a threshold value,
wherein the threshold value is changed based on an edge intensity of the first image data such that the threshold value decreases as the edge intensity increases.

\* \* \* \* \*